(12) United States Patent
Bar-Zeev et al.

(10) Patent No.: US 9,690,099 B2
(45) Date of Patent: Jun. 27, 2017

(54) OPTIMIZED FOCAL AREA FOR AUGMENTED REALITY DISPLAYS

(75) Inventors: Avi Bar-Zeev, Redmond, WA (US); John R. Lewis, Redmond, WA (US); Georg Klein, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1005 days.

(21) Appl. No.: 12/972,100

(22) Filed: Dec. 17, 2010

(65) Prior Publication Data

US 2012/0154277 A1 Jun. 21, 2012

(51) Int. Cl.
*G02B 27/01* (2006.01)
*G02B 27/00* (2006.01)
*G06F 3/01* (2006.01)

(52) U.S. Cl.
CPC ....... *G02B 27/017* (2013.01); *G02B 27/0093* (2013.01); *G06F 3/013* (2013.01); *G02B 2027/014* (2013.01); *G02B 2027/0178* (2013.01); *G02B 2027/0187* (2013.01)

(58) Field of Classification Search
CPC .... G06F 3/0304; G06F 3/0308; G06F 3/0325; G06F 3/04812; G06F 3/011; G06F 3/013; G02B 27/0093; G02B 27/017
USPC ......... 345/178, 156–157, 7–9; 715/701–702, 715/741; 455/410–411
See application file for complete search history.

(56) References Cited

U.S. PATENT DOCUMENTS

| | | | |
|---|---|---|---|
| 5,406,415 A | 4/1995 | Kelly | |
| 5,495,576 A * | 2/1996 | Ritchey | ......................... 345/420 |
| 5,737,012 A * | 4/1998 | Tabata et al. | ................... 348/53 |
| 6,222,675 B1 | 4/2001 | Mall et al. | |
| 7,595,933 B2 | 9/2009 | Tang | |
| 7,706,575 B2 | 4/2010 | Liu et al. | |
| 7,804,507 B2 | 9/2010 | Yang et al. | |
| 2002/0057280 A1* | 5/2002 | Anabuki et al. | ............. 345/633 |
| 2003/0025652 A1 | 2/2003 | Susnfara et al. | |
| 2005/0225723 A1 | 10/2005 | Pilu | |

(Continued)

FOREIGN PATENT DOCUMENTS

| | | |
|---|---|---|
| JP | 2000194467 A | 7/2000 |
| JP | 2008022236 A | 1/2008 |

(Continued)

OTHER PUBLICATIONS

Andiel, Eye-Tracking for Autostereoscopic Displays using Webcams, Jan. 21-23, 2002.*

(Continued)

*Primary Examiner* — Jonathan Horner
(74) *Attorney, Agent, or Firm* — Vierra Magen Marcus LLP

(57) ABSTRACT

A method and system that enhances a user's experience when using a near eye display device, such as a see-through display device or a head mounted display device is provided. An optimized image for display relative to the a field of view of a user in a scene is created. The user's head and eye position and movement are tracked to determine a focal region for the user. A portion of the optimized image is coupled to the user's focal region in the current position of the eyes, a next position of the head and eyes predicted, and a portion of the optimized image coupled to the user's focal region in the next position.

20 Claims, 20 Drawing Sheets

(56) References Cited

U.S. PATENT DOCUMENTS

| | | | |
|---|---|---|---|
| 2006/0098087 | A1 | 5/2006 | Brandt et al. |
| 2008/0002262 | A1 | 1/2008 | Chirieleison et al. |
| 2008/0024597 | A1* | 1/2008 | Yang et al. ............. 348/53 |
| 2008/0036875 | A1* | 2/2008 | Jones et al. ............. 348/222.1 |
| 2008/0285140 | A1* | 11/2008 | Amitai ............. 359/630 |
| 2009/0256904 | A1* | 10/2009 | Krill et al. ............. 348/47 |
| 2010/0287500 | A1 | 11/2010 | Whitlow et al. |

FOREIGN PATENT DOCUMENTS

| | | |
|---|---|---|
| JP | 2008502992 A | 1/2008 |
| WO | 0116640 A2 | 3/2001 |
| WO | 2010116831 A1 | 10/2010 |
| WO | 2010123934 A1 | 10/2010 |
| WO | 2010125378 A1 | 11/2010 |

OTHER PUBLICATIONS

Chinese Office Action dated Dec. 25, 2013, Chinese Patent Application No. 201110444280.1.
Response to Office Action dated Jan. 8, 2014, European Patent Application No. 11848918.6.
English Abstract of Japanese Publication No. JP2008022236 published on Jan. 31, 2008.
Examination Report dated Oct. 14, 2013, European Patent Application No. 11848918.6.
Azuma, Ronald and Gary Bishop. "A Frequency-Domain Analysis of Head-Motion Prediction." Proceedings of the 22nd annual Conference on Computer Graphics and Interactive Techniques, Aug. 6-11, 1995, pp. 401-408, ACM, Los Angeles, CA, USA.
Helmet Mounted Display (HMD) with Built-in Eye Tracker. Datasheet [online]. National Aerospace Laboratory NLR (Nationaal Lucht-en Ruimtevaartlaboratorium), Jan. 2009, pp. 1-4. Retrieved from the National Aerospace Laboratory of the Netherlands using Internet: <URL: http://www.nlr.nl/ATTS/flyer%20HMD%020F294-03.pdf>.
Peli, Eli. "Visual and Optometric Issues with Head-Mounted Displays." Proceedings of the IS&T Conference on Optics & Imaging in the Information Age 1996, Oct. 20-25, 1996, pp. 364-369. The Society for Imaging Science and Technology, Rochester, NY, USA.
Wagner, et al. "A Pivotable Head Mounted Camera System that is Aligned by Three-Dimensional Eye Movements." Proceedings of the 2006 Symposium on Eye tracking research & applications, Mar. 27-29, 2006, pp. 117-124, ACM, San Diego, CA, USA.
Gould, et al. "Peripheral-Foveal Vision for Real-time Object Recognition and Tracking in Video", IJCAI-07 2115, Stanford, CA, Proceeding IJCAI '07, Proceedings of the 20th international joint conference on Artificial intelligence, 2007.
Notification of Transmittal of the International Search Report and the Written Opinion, dated Jul. 31, 2012, in International Appl. No. PCT/US2011/064750.
Andiel et al., Eye-Tracking for Autostereoscopic Displays Using Web Cams, Proceedings of SPIE, Stereoscopic Displays and Applications XIII, vol. 4600, San Jose. CA. USA. Jul. 21-23, 2002.
European Search Report dated Aug. 26, 2013, European Patent Application No. 11848918.6.
Amendment dated Jan. 27, 2014, Chinese Patent Application No. 201110444280.1.
Office Action dated Jun. 5, 2014, Chinese Patent Application No. 201110444280.1.
Amendment dated Jun. 26, 2014, Chinese Patent Application No. 201110444280.1.
Decision to Grant dated Aug. 7, 2014, European Patent Application No. 11848918.6.
Notice of Grant dated Sep. 3, 2014 in Chinese Patent Application No. 201110444280.01.
Amendment dated Dec. 12, 2014, Japanese Patent Appl. No. 2013-544713, filed Dec. 14, 2011.
Notice of Allowance datted Jun. 2, 2016 in Japanese Patent Application No. 2013-5447103 with English translation.
"Office Action Issued in Japanese Patent Application No. 2013-544713", Mailed date: Feb. 9, 2016, 8 Pages.
Yasuda, et al., "A Study on Server Rendering for Interactive 3D Virtual Environments on a Web Browser", in Journals of Human Interface Published by Human Interface Society of Japan, vol. 10, Nov. 6, 2008, pp. 17-20.

* cited by examiner

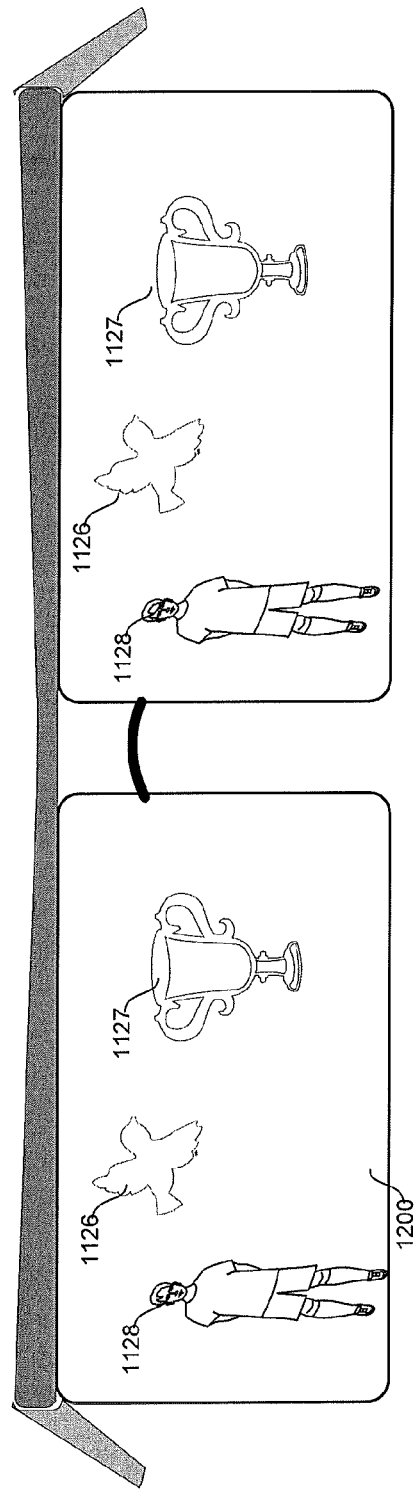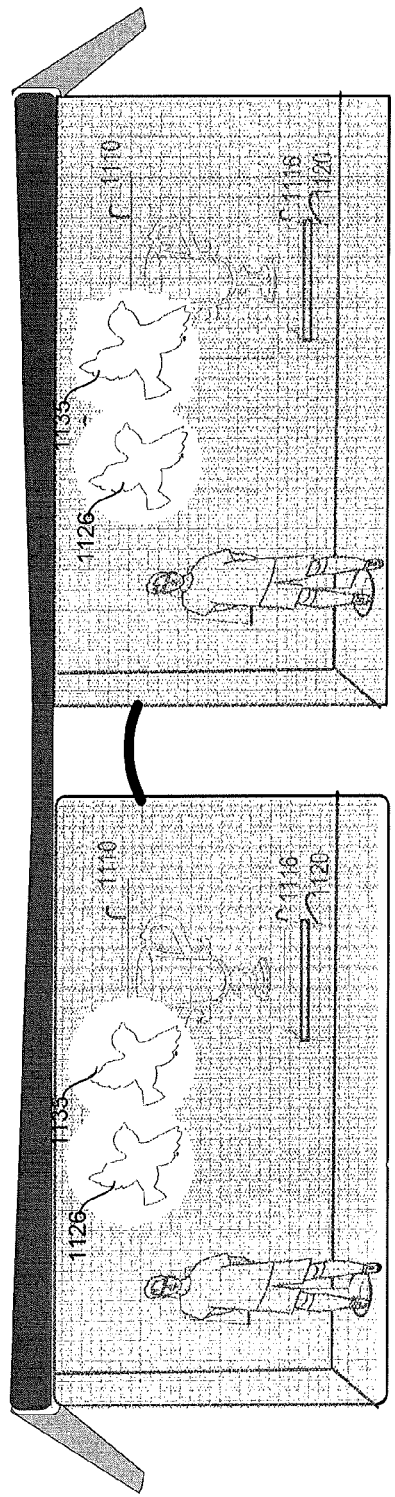

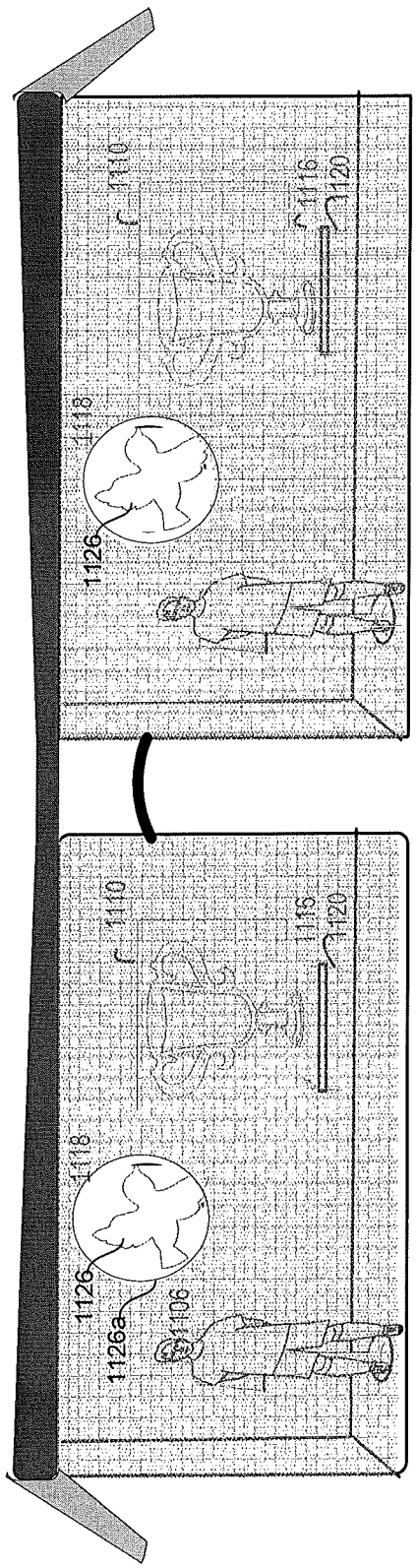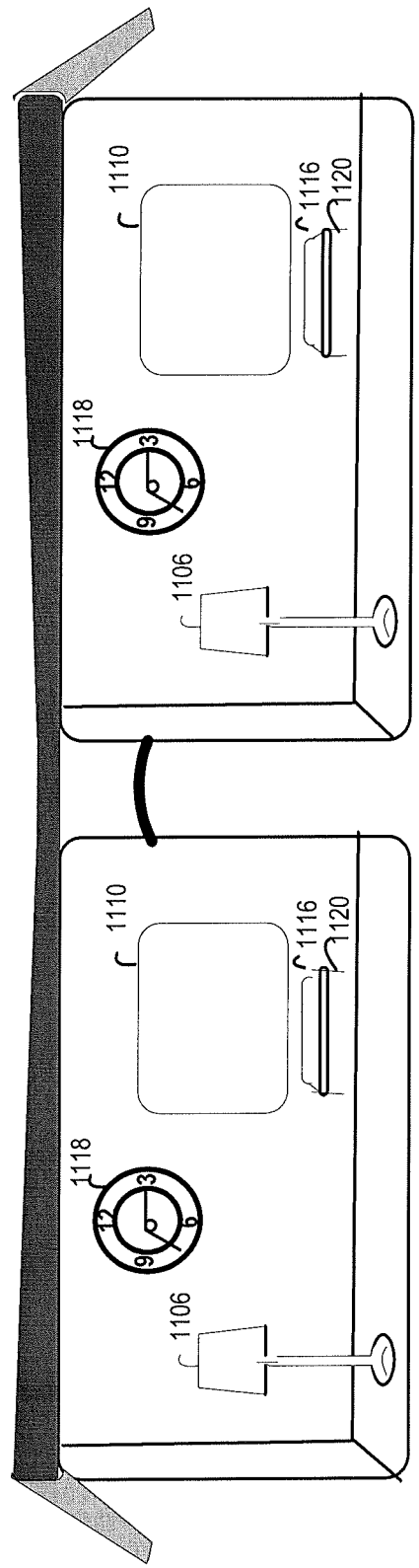

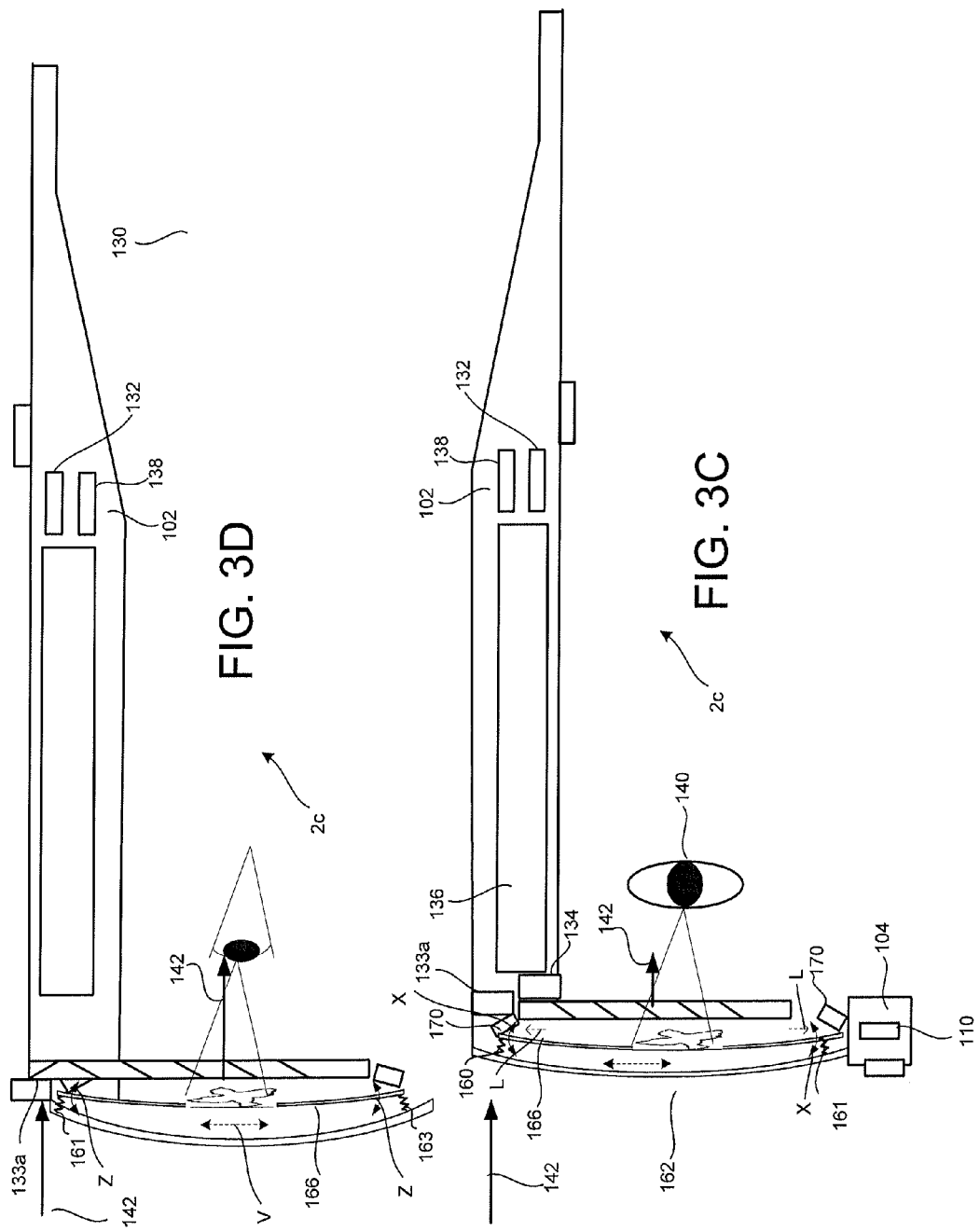

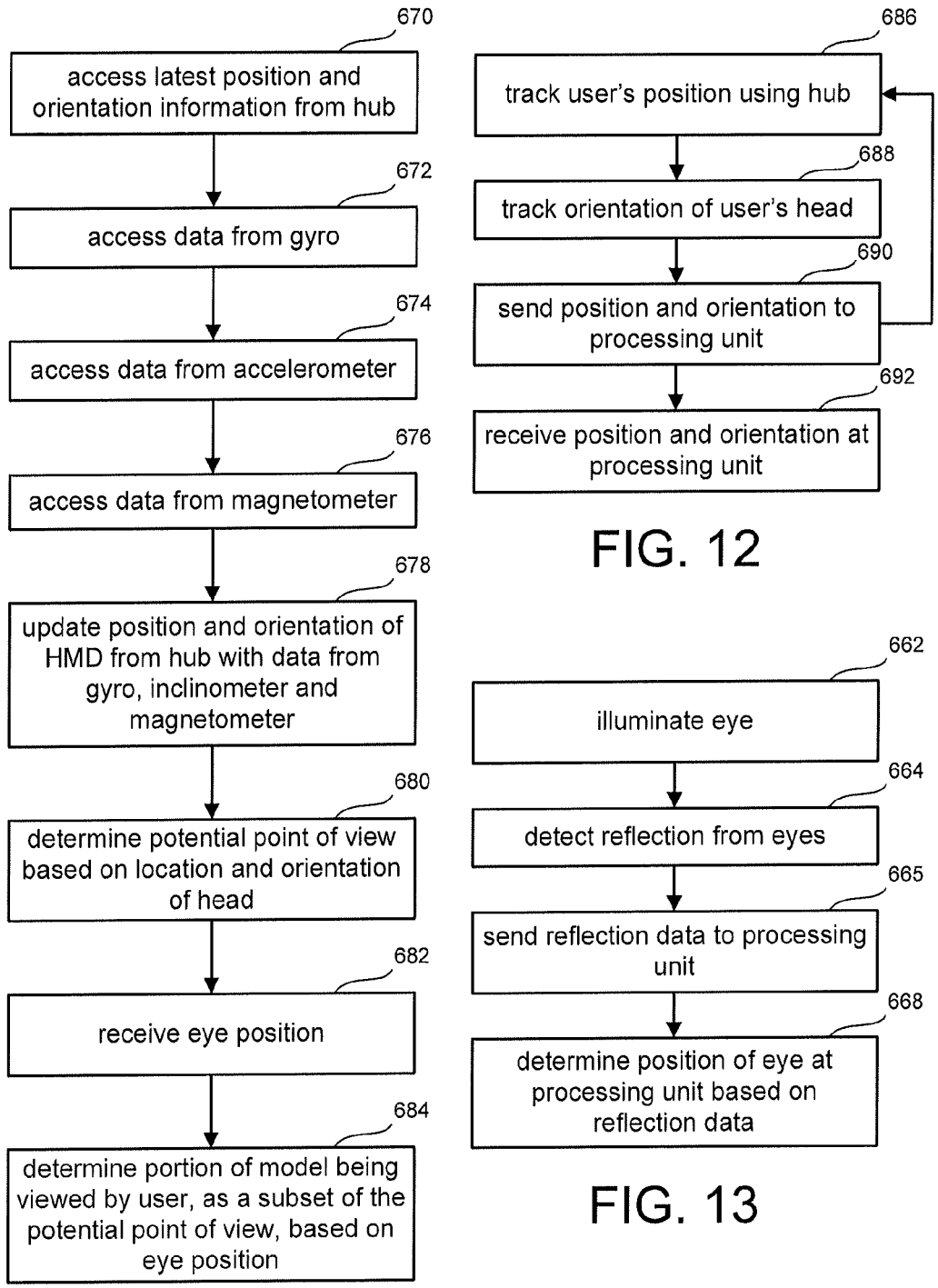

OPTIMIZED FOCAL AREA FOR AUGMENTED REALITY DISPLAYS

BACKGROUND OF THE TECHNOLOGY

Augmented reality is a technology that allows virtual imagery to be mixed with a real world physical environment or space. In general, near-eye displays use a combination of optics and stereopsis to focus virtual imagery within the space. In such displays, display resolution and processing is at a premium.

In certain situations, the virtual imagery that is displayed to a user via a near-eye display device may include virtual images or objects that include highly detailed graphics. A user wearing a near-eye display device is typically presented with large amounts of information that the user is not necessarily interested in looking at.

SUMMARY

The technology briefly described includes a method for presenting an optimized image to a user. An optimized image for display relative to the whole a field of view of a user in a scene is created. The user's head and eye position and movement are tracked to determine a focal region for the user. A portion of the optimized image is coupled to the user's focal region in the current position of the eyes, a next position of the head and eyes predicted, and a portion of the optimized image coupled to the user's focal region in the next position.

In addition, a head mounted display device is provided. The head mounted display includes a display coupling at least a portion of an optimized image to a user's focal region. Inertial, magnetic, mechanical and/or other sensors sense orientation information for the head mounted display device and eye tracking sensors detect user eye position. A processing unit, in communication with the display, inertial and/or other sensors and eye tracking sensors, automatically displays an optimized portion of the optimized image at a current position of the user's eye relative to the display so that the portion of the image is coupled to the user's focal region. The processing device then determines a next position of the user's eye and displays another optimized portion of the optimized image at the next position of the user's eye relative to the display so that the portion of the image is coupled to the user's focal region at the next position.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

BRIEF DESCRIPTION OF THE DRAWINGS

FIG. 2B depicts one embodiment of a user's view of one or more objects in a user's environment.

FIG. 2C is an illustration of an optimized image at full resolution presented overlaying the user's view of the user's environment.

FIG. 2D is an illustration of a user's view of an optimized portion of a full resolution image and a partially obscured field of view.

FIG. 2G is an illustration of a simultaneously rendered current and next position optimized portion of a full resolution image and partially obscured field of view for a user.

FIGS. 3C and 3D are a top view and a side view of a portion of another embodiment of a head mounted display unit.

FIG. 11 is a flowchart describing one embodiment of a process for tracking the field of view of a user and determining the user's focal region.

FIG. 12 is a flowchart describing one embodiment of a process performed by the hub computing system to provide tracking information used in the process of FIG. 2A.

FIG. 13 is a flowchart describing one embodiment of a process for tracking an eye, the results of which are used by the process of FIG. 12.

DETAILED DESCRIPTION

Technology is disclosed by which a user's experience when using a near eye display device is enhanced. A user looks at a scene via a near eye display device such as a head mounted display device. The user's field of view, which is the environment or space that the user is looking at, is determined. An image optimized for use with respect to the field of view is rendered. The user's focal region is determined by tracking the position of the user's eyes in the field of view. Display of the optimized image is provided by coupling an optimized portion of the image to the user's focal region, in one case the user's fovea, to reduce processing and energy required for a display. The user eye position is tracked, and a next eye position calculated, to position the portion of the image at a next position coincident with the user's movement of the eye to the next position.

Positioning of the optimized portion of the image is performed by any number of different display devices, including a mechanically controlled mirror and projection display. A predictive algorithm is used to determine the potential next positions of a user's eye.

Figure 1:
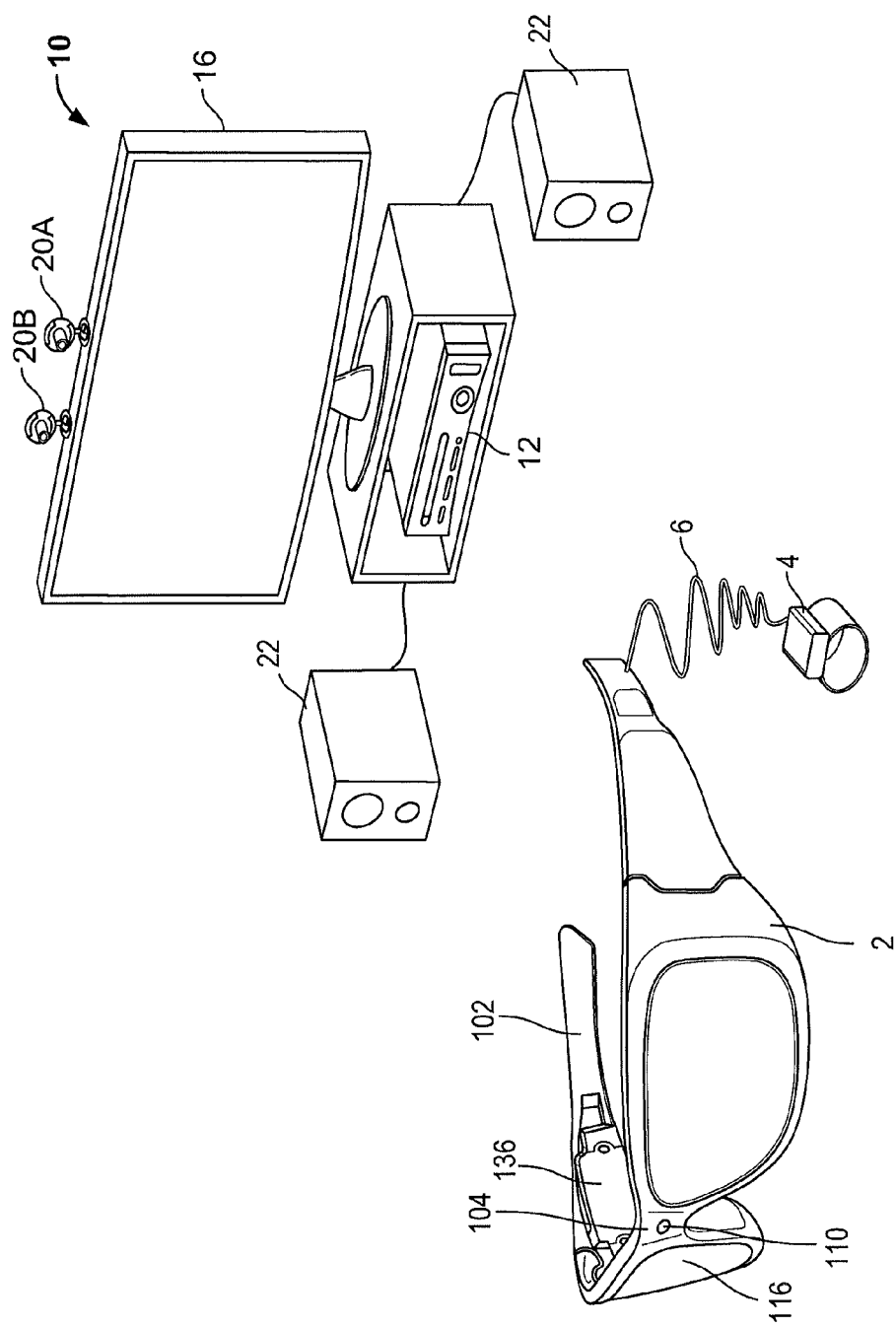
FIG. 1 is a block diagram depicting example components of one embodiment of the system for generating optimized content based on user intent.

FIG. 1 is a block diagram depicting example components of one embodiment of a system 10 for generating an optimized image based on user intent. System 10 includes a see-through display device as a near-eye, head mounted display device 2 in communication with processing unit 4 via wire 6. In other embodiments, head mounted display device 2 communicates with processing unit 4 via wireless communication. Although the components of FIG. 1 illustrate a see-through display device, other display embodiments suitable for use with the present technology are illustrated in FIGS. 3B-3D.

Head mounted display device 2, which in one embodiment is in the shape of glasses, is worn on the head of a user so that the user can see through a display and thereby have an actual direct view of the space in front of the user. The use of the term "actual and direct view" refers to the ability to see the real world objects directly with the human eye, rather than seeing created image representations of the objects. For example, looking through glass at a room allows a user to have an actual direct view of the room, while viewing a video of a room on a television is not an actual direct view of the room. More details of the head mounted display device 2 are provided below. Although the device shown in FIGS. 1 and 3A-3D is in the form of glasses, the head mounted display device 2 may take other forms, such as a helmet with goggles.

In one embodiment, processing unit 4 is worn on the user's wrist and includes a portion of the computing power used to operate head mounted display device 2. Processing unit 4 communicates wirelessly (e.g., WiFi, Bluetooth, infrared, or other wireless communication means) to one or more hub computing systems 12.

Hub computing system 12 may be a computer, a gaming system or console, or the like. According to an example embodiment, the hub computing system 12 may include hardware components and/or software components such that hub computing system 12 may be used to execute applications such as gaming applications, non-gaming applications, or the like. In one embodiment, hub computing system 12 may include a processor such as a standardized processor, a specialized processor, a microprocessor, or the like that may execute instructions stored on a processor readable storage device for performing the processes described herein.

In various embodiments, the processes described herein with respect to FIGS. 2A, and 8-15 are performed in whole or in part by either hub computing system 12, processing unit 4 and/or a combination of the two.

Hub computing system 12 further includes one or more capture devices, such as capture devices 20A and 20B. In other embodiments, more or less than two capture devices can be used. In one example implementation, the capture devices 20A and 20B are pointed in different directions so that they capture different portions of the room. It may be advantageous that the field of view of the two capture devices slightly overlap so that hub computing system 12 can understand how the fields of view of the capture devices relate to each other. In this manner, multiple capture devices can be used to view an entire room (or other space). Alternatively, one capture device can be used if the capture device can be panned during operation so that over time the entire relevant space is viewed by the capture device.

Capture devices 20A and 20B may be, for example, cameras that visually monitor one or more users and the surrounding space such that gestures and/or movements performed by the one or more users, as well as the structure of the surrounding space, may be captured, analyzed, and tracked to perform one or more controls or actions within the application and/or animate an avatar or on-screen character.

Hub computing system 12 may be connected to an audiovisual device 16 such as a television, a monitor, a high-definition television (HDTV), or the like that may provide game or application visuals. For example, hub computing system 12 may include a video adapter such as a graphics card and/or an audio adapter such as a sound card that may provide audiovisual signals associated with the game application, non-game application, etc. The audiovisual device 16 may receive the audiovisual signals from hub computing system 12 and may then output the game or application visuals and/or audio associated with the audiovisual signals. According to one embodiment, the audiovisual device 16 may be connected to hub computing system 12 via, for example, an S-Video cable, a coaxial cable, an HDMI cable, a DVI cable, a VGA cable, component video cable, RCA cables, etc. In one example, audiovisual device 16 includes internal speakers. In other embodiments, audiovisual device 16, a separate stereo or hub computing system 12 is connected to external speakers 22.

Hub computing device 10, with capture devices 20A and 20B, may be used to recognize, analyze, and/or track human (and other types of) targets. For example, a user wearing head mounted display device 2 may be tracked using the capture devices 20A and 20B such that the gestures and/or movements of the user may be captured to animate an avatar or on-screen character and/or may be interpreted as controls that may be used to affect the application being executed by hub computing system 12.

In one embodiment of the disclosed technology, and as will be discussed in detail below, system 10 generates an optimized image for the user based on determining the user's field of view and focal region. The optimized image may include, for example an enhanced appearance of objects or artificially overlaid objects on a field of view, which provides an enhanced experience for the user. The optimized image is displayed to the user, via the head mounted display device 2, in optimized portions (illustrated in FIG. 2B) depending on the user's eye position and movement patterns.

Figure 2A:
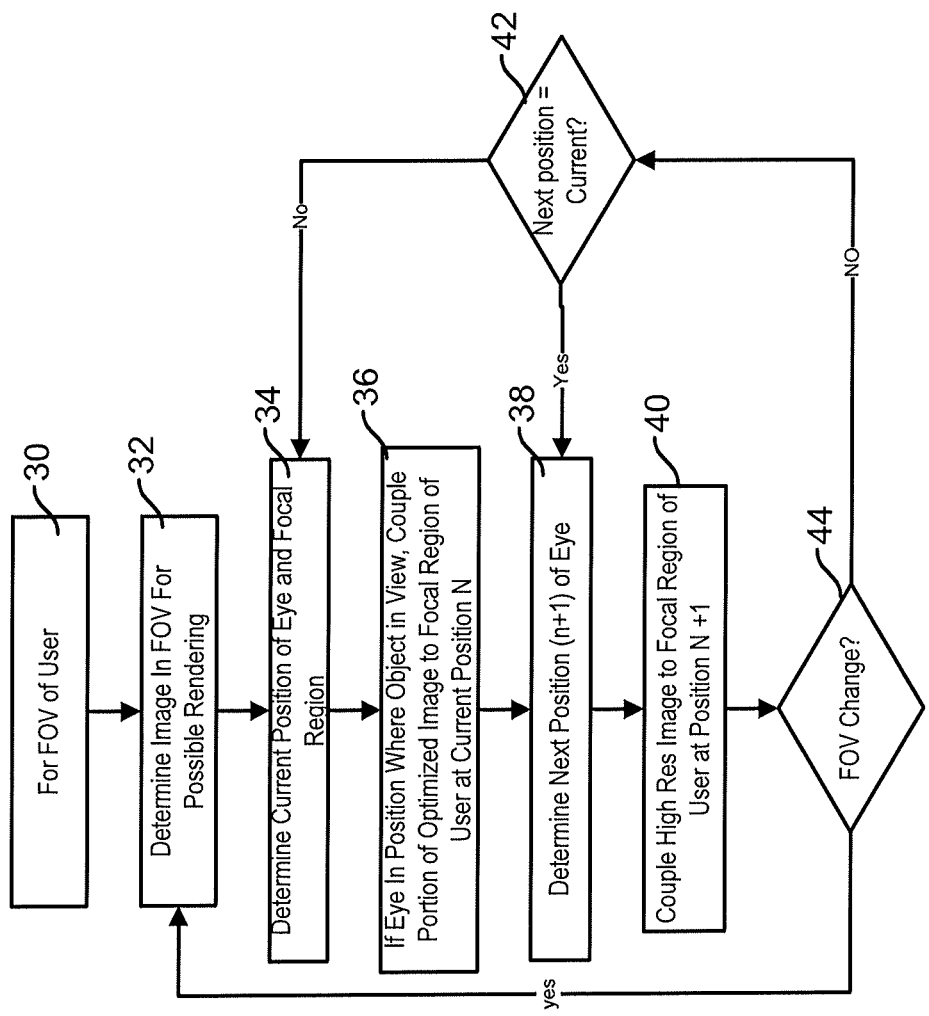
FIG. 2A is a flowchart depicting a method in accordance with the technology.

FIG. 2A illustrates one embodiment of a method for coupling a portion of an optimized image to an eye in a display. The process of FIG. 2A will be described in relation to FIGS. 2B-2G.

Figure 2E:
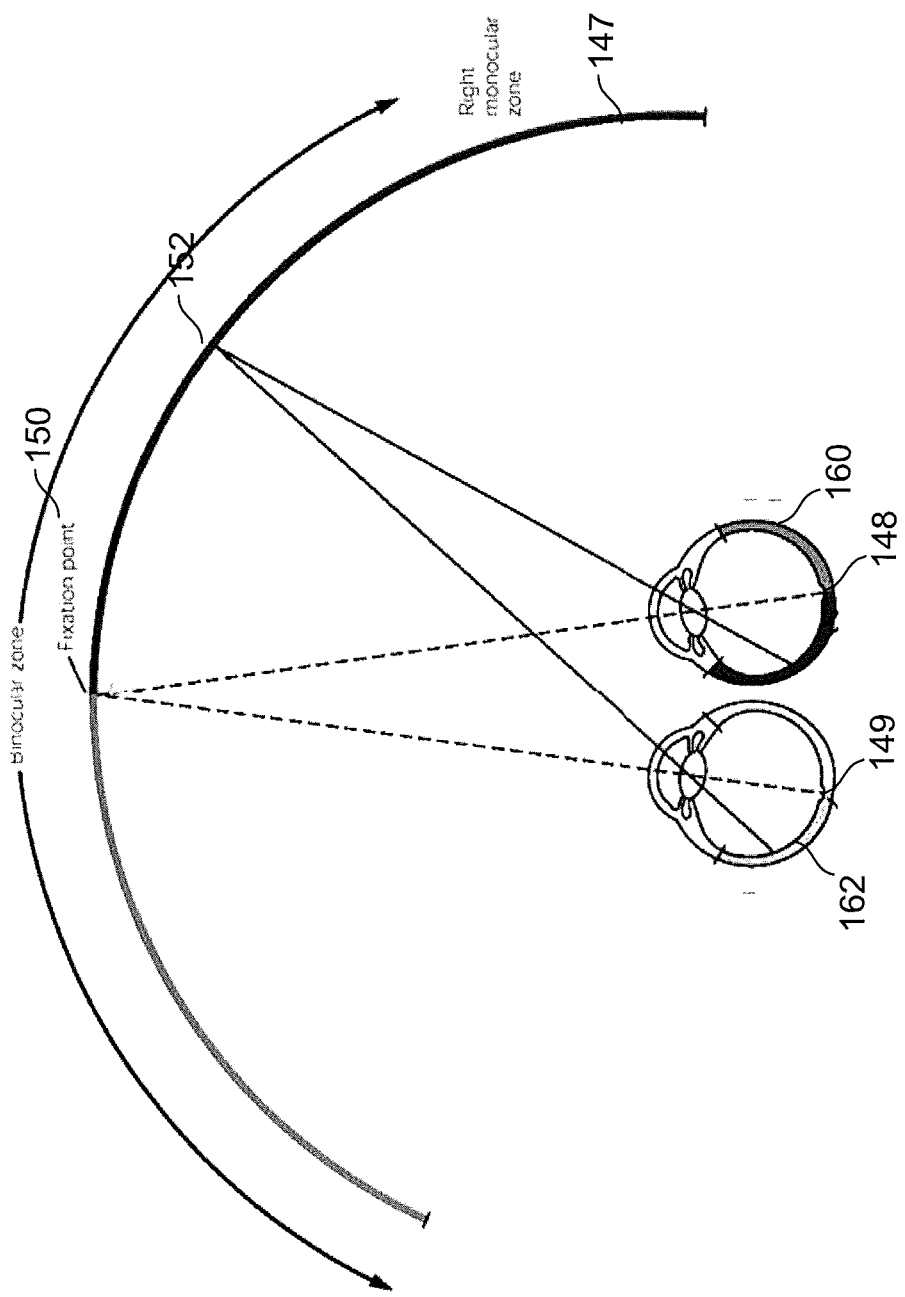
FIG. 2E is an illustration of one type of focal region utilized with the present technology.
Figure 2F:
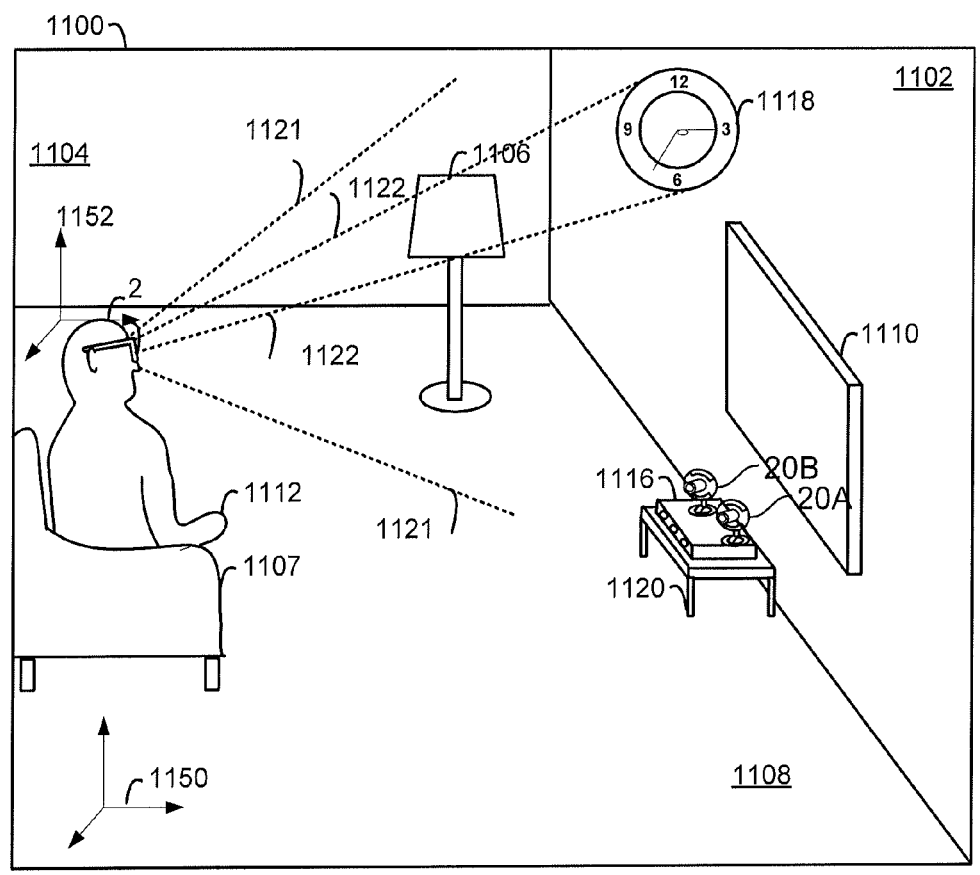
FIG. 2F an illustration of a user's environment.

At step 30, a field of view and a focal region for a user are determined. As noted above, the field of view for a user is a function of: the user's environment or scene, the user's head position and orientation, and the user's eye position. FIG. 2F illustrates a user 1112 in an environment 1100. A user 1112 is shown viewing a field of vision (defined by lines 1121) a number of objects including a lamp 1106, table 1120, processing device 1116, capture devices 20A, 20B, display 1110 and clock 1118. The user also sees floor 1108 and wall 1102, but not chair 1107 and only a portion of wall 1104. The environment 1100 may be defined relative to a coordinate system 1150, and the user's head position defined relative to a second coordinate system 1152.

In one embodiment, the focal region within the field of view of a user is that region at a fixation point 150 along the focal curve. For example, the convergence between the pupils can be used to triangulate to a focal point on a focal curve 147, the Horopter, from which the focal region and the Panum's fusion area, can be calculated. The Panum's fusional area 147 is the area of one retina such that any point in it will fuse with a single point on the other retina and create single vision for binocular stereopsis by the human eyes. As illustrated in FIG. 2E, each user's eye includes a fovea centralis, also generally known as the fovea, located in the center of the macula region of the retina. The fovea is responsible for sharp central vision (also called foveal vision), which is necessary in humans for reading, watching television or movies, driving, and any activity where visual detail is of primary importance. The fovea in FIG. 2E are illustrated at 148 and 149.

Directing or coupling an optimized image relative to the fovea 148, 149 would ensure that a user can focus vision relative to the optimized portion of the image. In addition, the portion of the image required for coupling to the fovea is relatively small—on the order of a 1 mm diameter image on the retina. Rendering of a relatively small area portion by the head mounted display 2 reduces the power requirements for the head mounted display 2.

At step 32, an optimized image to be displayed to a user for the determined field of view is created. The optimized image is determined by an application rendering the image and may comprise one or more individual overlay images within a field of view or encompass an entire field of view.

FIG. 2B illustrates what the user 1112 in environment 1100 sees through display device 2 when no image is projected on the display. FIG. 2C illustrates an optimized image which may be projected on the scene in FIG. 2B. In the example of FIG. 2C, the optimized image 1200 completely obscures the scene of environment 1100. In this example, the scene depicts a man 1128, a bird image 1126 and a trophy 1127. In one embodiment, the application rendering the image has determined the configuration and location of these elements within the scene and whether such objects should obscure real world objects such as the lamp 1106, clock 1118 and display 1110.

At step 34, the current position of the user's eye is determined and at 36, an optimized portion of the optimized imaged is coupled to the focal region of the user at the current position of the eye. In one example, this is illustrated in FIG. 2D, wherein an image of a bird image 1126 is illustrated as highlighted and superimposed on the real world environment 1100, with the bird image 1126 highlighted with respect to the balance of the image. In one embodiment, other elements of the optimized image (in this case the man and the trophy), are not rendered, or rendered in a lower resolution (now shown). In a further aspect, other visual elements of the room may be obfuscated from the user's view.

By concentrating the processing power of the display device on rendering only that optimized portion of the image which is coupled to the user's foveal vision, other elements in the optimized image need not be rendered, or may be rendered with less precision and hence less resources, than the optimized image. In one embodiment, the optimized image is a fraction of the entire image. A normal eye pupil may have a diameter between 1 mm in bright light and 7 mm in the dark. Displays are normally optimized for a 3 mm diameter light. By concentrating the portion of the image on the pupil, one can directly translate the image light to the user's focal region, substantially reducing the light are required to generate an image.

To concentrate a portion of an image on a subject's pupil, the light ray generated by an image is given a direction and target point on the pupil. Some rays from in the vicinity of the eye will enter the eye pupil, but rays that do not enter the pupil are wasted, consume power and can have other undesirable effects.

One may generally consider that rays from a distant point are all nearly parallel in the vicinity of the eye and share an approximately common direction. Ideally, the optics of the eye bring these rays to a focus at the foveal region on the retina. Parallel rays from a different direction will be seen as a different point.

To optimize the image at the pupil of an eye, the head mounted display alters the direction and the entry point on the pupil where rays from the image are directed. Where a subject may correct for optical distortions of a scene viewed through an optical element in free space, correction and direction of the image display is performed by the mechanics of the head mounted display in the present technology.

In accordance with the technology, the positioning systems 160, 160a of the embodiments described below provide directional positioning of a micro display or a mirror reflecting the image to the user. This directional positioning, along with positioning of the image relative to the display or mirror, provides an optimized position and direction relative to the eye location. This can be achieved by, for example, tilting display 153 or mirror 166 in three dimensions, with the image rendered on the display or mirror and a proper location on the mirror or display.

It will be recognized that various other types of mechanical or electromechanical elements may be provided to optimize the direction of the displayed image in addition to those set forth below. This directional positioning in conjunctions with the predictive eye tracking of the present technology provides an optimized processing for the system.

In order to maintain this coupling of the optimized portion of the image, the user's next likely eye movement is tracked at step 38 and at step 40, another optimized portion of the optimized display image is coupled to the user's focal region at the next position at 240. If the field of view changes at 44, a new field of view is determined at 32. If the field of view is not changed at 44, then a determination is made as to whether the user's eye actually moved to the predicted position at 38 and the method calculates a potential next eye movement position at 38. The loop of tracking the current position of the eye at 44, calculating a next position at 38 may be performed by one or more microprocessors or a dedicated tracking circuit in a near instantaneous manner, in order to move the portion of the optimized image to the next location of a user's eye movement coincident with that movement, in order to provide a suitable visual experience.

It should be recognized that the use of the terms next and current in the aforementioned description need not be limited to a single portion of the image. For example, with reference to FIG. 2G, each portion rendered at steps 36 or 40 as a current position may comprise a portion of an image at a first time T (image 1126) and a portion of an image at a second time T2 (image 1135) where the user's eye is predicted to be at time t2, such that each "current" and "next" portion described in FIG. 2A may comprise two image portions.

Still further, it should be recognized that alternative portions of image 1200 may be rendered in at full or partially full resolution in order to attract the user's eye to that position. For example, the application may choose to render player 1128 or trophy 1127 in order to attract the eye movement of the user and the user's attention in the given context of the application.

It should be further recognized that the present technology does not require the use of overlay images, and may be advantageously used to display only images to the user without reference to the user's environment.

Figure 3A:
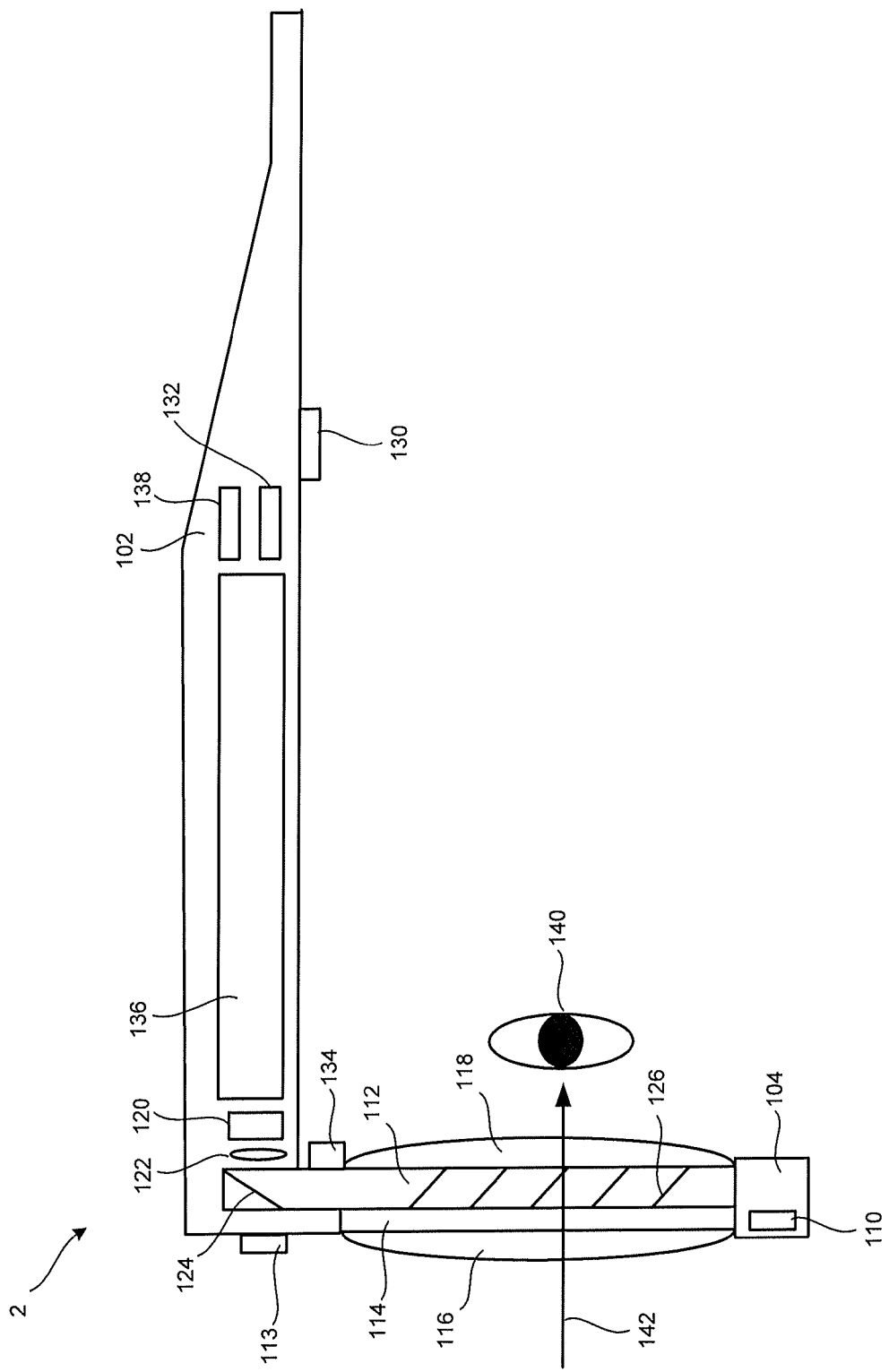
FIG. 3A is a top view of a portion of one embodiment of a head mounted display unit.
Figure 3B:
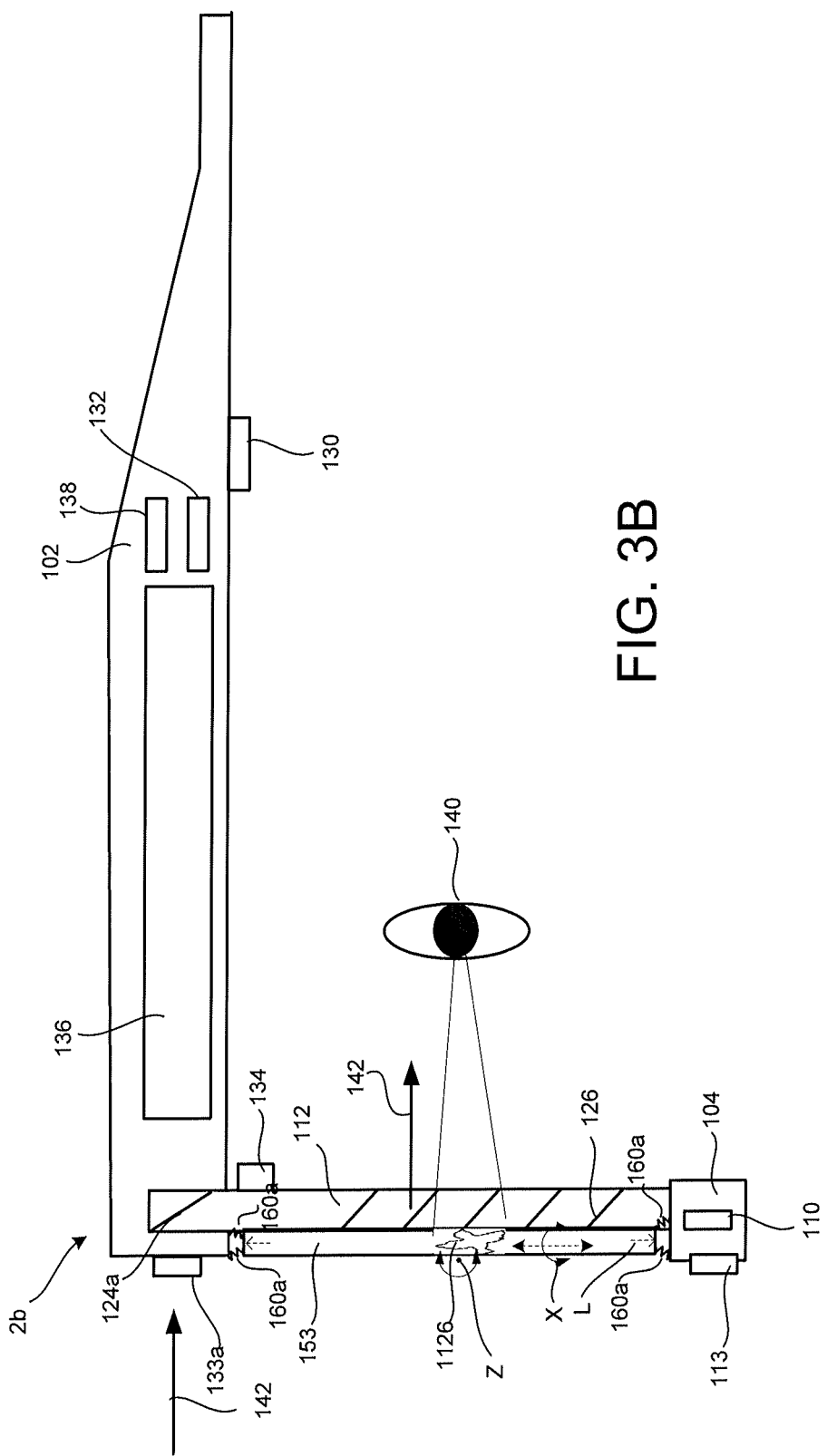
FIG. 3B is a top view of a portion of another embodiment of a head mounted display unit.

FIG. 3A depicts a top view of a portion of head mounted display device 2, including a portion of the frame that includes temple 102 and nose bridge 104. Only the right side of head mounted display device 2 is depicted. Built into nose bridge 104 is a microphone 110 for recording sounds and transmitting that audio data to processing unit 4, as described below. At the front of head mounted display device 2 is room facing video camera 113 that can capture video and still images. Those images are transmitted to processing unit 4, as described below.

A portion of the frame of head mounted display device 2 will surround a display (that includes one or more lenses). In order to show the components of head mounted display device 2, a portion of the frame surrounding the display is not depicted. The display includes a light guide optical element 112, opacity filter 114, see-through lens 116 and see-through lens 118. In one embodiment, opacity filter 114 is behind and aligned with see-through lens 116, lightguide optical element 112 is behind and aligned with opacity filter 114, and see-through lens 118 is behind and aligned with lightguide optical element 112. See-through lenses 116 and 118 are standard lenses used in eye glasses and can be made to any prescription (including no prescription). In one embodiment, see-through lenses 116 and 118 can be replaced by a variable prescription lens. In some embodiments, head mounted display device 2 will include only one see-through lens or no see-through lenses. In another alternative, a prescription lens can go inside light guide optical element 112. Opacity filter 114 filters out natural light (either on a per pixel basis or uniformly) to enhance the contrast of the virtual imagery. Light guide optical element 112 channels artificial light to the eye. More details of the opacity filter 114 and light guide optical element 112 is provided below.

Mounted to or inside temple 102 is an image source, which (in one embodiment) includes micro display assembly 120 for projecting a virtual image and lens 122 for directing images from micro display 120 into light guide optical element 112. In one embodiment, lens 122 is a collimating lens.

Control circuits 136 provide various electronics that support the other components of head mounted display device 2. More details of control circuits 136 are provided below with respect to FIGS. 4A and 4B. Inside, or mounted to temple 102, are ear phones 130, inertial and/or magnetic sensors 132 and temperature sensor 138. In one embodiment inertial and magnetic sensors 132 include a three axis magnetometer 132A, three axis gyro 132B and three axis accelerometer 132C (See FIG. 5). The inertial and/or magnetic sensors are for sensing position, orientation, and sudden accelerations of head mounted display device 2.

Micro display 120 projects an image through lens 122. There are different image generation technologies that can be used to implement micro display 120. For example, micro display 120 can be implemented in using a transmissive projection technology where the light source is modulated by optically active material, backlit with white light. These technologies are usually implemented using LCD type displays with powerful backlights and high optical energy densities. Micro display 120 can also be implemented using a reflective technology for which external light is reflected and modulated by an optically active material. The illumination is forward lit by either a white source or RGB source, depending on the technology. Digital light processing (DLP), liquid crystal on silicon (LCOS) and Mirasol® display technology from Qualcomm, inc. are all examples of reflective technologies which are efficient as most energy is reflected away from the modulated structure and may be used in the system described herein. Additionally, micro display 120 can be implemented using an emissive technology where light is generated by the display. For example, a PicoP™ display engine from Microvision, Inc. emits a laser signal with a micro mirror steering either onto a tiny screen that acts as a transmissive element or beamed directly into the eye (e.g., laser).

Light guide optical element 112 transmits light from micro display 120 to the eye 140 of the user wearing head mounted display device 2. Light guide optical element 112 also allows light from in front of the head mounted display device 2 to be transmitted through light guide optical element 112 to eye 140, as depicted by arrow 142, thereby allowing the user to have an actual direct view of the space in front of head mounted display device 2 in addition to receiving a virtual image from micro display 120. Thus, the walls of light guide optical element 112 are see-through. Light guide optical element 112 includes a first reflecting surface 124 (e.g., a mirror or other surface). Light from micro display 120 passes through lens 122 and becomes incident on reflecting surface 124. The reflecting surface 124 reflects the incident light from the micro display 120 such that light is trapped inside a planar, substrate comprising light guide optical element 112 by internal reflection. After several reflections off the surfaces of the substrate, the trapped light waves reach an array of selectively reflecting surfaces 126. Note that only one of the five surfaces is labeled 126 to prevent over-crowding of the drawing. Reflecting surfaces 126 couple the light waves incident upon those reflecting surfaces out of the substrate into the eye 140 of the user. As different light rays will travel and bounce off the inside of the substrate at different angles, the different rays will hit the various reflecting surface 126 at different angles. Therefore, different light rays will be reflected out of the substrate by different ones of the reflecting surfaces. The selection of which light rays will be reflected out of the substrate by which surface 126 is engineered by selecting an appropriate angle of the surfaces 126. More details of a light guide optical element can be found in United States Patent Application Publication 2008/0285140, Ser. No. 12/214,366, published on Nov. 20, 2008, "Substrate-Guided Optical Devices" incorporated herein by reference in its entirety. In one embodiment, each eye will have its own light guide optical element 112. When the head mounted display device has two light guide optical elements, each eye can have its own micro display 120 that can display the same image in both eyes or different images in the two eyes. In another embodiment, there can be one light guide optical element which reflects light into both eyes.

Opacity filter 114, which is aligned with light guide optical element 112, selectively blocks natural light, either uniformly or on a per-pixel basis, from passing through light guide optical element 112. In one embodiment, the opacity filter can be a see-through LCD panel, electro chromic film, PDLC (Polymer dispersed Liquid Crystal) or similar device which is capable of serving as an opacity filter. Such a see-through LCD panel can be obtained by removing various layers of substrate, backlight and diffusers from a conventional LCD. The LCD panel can include one or more light-transmissive LCD chips which allow light to pass through the liquid crystal. Such chips are used in LCD projectors, for instance.

Opacity filter 114 can include a dense grid of pixels, where the light transmissivity of each pixel is individually controllable between minimum and maximum transmissivities. While a transmissivity range of 0-100% is ideal, more limited ranges are also acceptable. As an example, a monochrome LCD panel with no more than two polarizing filters is sufficient to provide an opacity range of about 50% to 99% per pixel, up to the resolution of the LCD. At the minimum of 50%, the lens will have a slightly tinted appearance, which is tolerable. 100% transmissivity represents a perfectly clear lens. An "alpha" scale can be defined from 0-100%, where 0% allows no light to pass and 100% allows all light to pass. The value of alpha can be set for each pixel by the opacity filter control circuit 224 described below.

A mask of alpha values can be used from a rendering pipeline, after z-buffering with proxies for real-world objects. When the system renders a scene for the augmented reality display, it takes note of which real-world objects are in front of which virtual objects. If a virtual object is in front of a real-world object, then the opacity should be on for the coverage area of the virtual object. If the virtual is (virtually) behind a real-world object, then the opacity should be off, as well as any color for that pixel, so the user will only see the real-world object for that corresponding area (a pixel or more in size) of real light. Coverage would be on a pixel-by-pixel basis, so the system could handle the case of part of a virtual object being in front of a real-world object, part of the virtual object being behind the real-world object, and part of the virtual object being coincident with the real-world object. Displays capable of going from 0% to 100% opacity at low cost, power, and weight are the most desirable for this use. Moreover, the opacity filter can be rendered in color, such as with a color LCD or with other displays such as organic LEDs, to provide a wide field of view. More details of an opacity filter are provided in U.S. patent application Ser. No. 12/887,426, "Opacity Filter For See-Through Mounted Display," filed on Sep. 21, 2010, incorporated herein by reference in its entirety.

An opacity filter such as an LCD has generally not been used with a see-through lens as described herein because at this near distance to the eye it can be out of focus. However, in some cases, this result can be desirable. A user sees the virtual image with crisp color graphics via the normal HMD display using additive color, which is designed to be in focus. The LCD panel is placed "behind" this display such that a fuzzy black border surrounds any virtual content, making it as opaque as desired. The system converts the flaw of natural blurring to expediently obtain the feature of anti-aliasing and bandwidth reduction. These are a natural result of using a lower-resolution and out-of-focus image. There is an effective smoothing of the digitally-sampled image. Any digital image is subject to aliasing, where the discrete nature of the sampling causes errors against the naturally analog and continuous signal. Smoothing means visually closer to the ideal analog signal. Although information lost to the low resolution is not recovered, the resulting errors are less noticeable.

In one embodiment, the display and the opacity filter are rendered simultaneously and are calibrated to a user's precise position in space to compensate for angle-offset issues. Eye tracking can be employed to compute the correct image offset at the extremities of the viewing field. In some embodiments, a temporal or spatial fade in the amount of opacity can be used in the opacity filter. Similarly, a temporal or spatial fade in the virtual image can be used. In one approach, a temporal fade in the amount of opacity of the opacity filter corresponds to a temporal fade in the virtual image. In another approach, a spatial fade in the amount of opacity of the opacity filter corresponds to a spatial fade in the virtual image.

In one example approach, an increased opacity is provided for the pixels of the opacity filter which are behind the virtual image, from the perspective of the identified location of the user's eye. In this manner, the pixels behind the virtual image are darkened so that light from a corresponding portion of the real world scene is blocked from reaching the user's eyes. This allows the virtual image to be realistic and represent a full range of colors and intensities. Moreover, power consumption by the augmented reality emitter is reduced since the virtual image can be provided at a lower intensity. Without the opacity filter, the virtual image would need to be provided at a sufficiently high intensity which is brighter than the corresponding portion of the real world scene, for the virtual image to be distinct and not transparent. In darkening the pixels of the opacity filter, generally, the pixels which follow the closed perimeter of virtual image are darkened, along with pixels within the perimeter. It can be desirable to provide some overlap so that some pixels which are just outside the perimeter and surround the perimeter are also darkened (at the same level of darkness or less dark than pixels inside the perimeter). These pixels just outside the perimeter can provide a fade (e.g., a gradual transition in opacity) from the darkness inside the perimeter to full amount of non-darkness outside the perimeter.

Head mounted display device 2 also includes a system for tracking the position of the user's eyes. As will be explained below, the system will track the user's position and orientation so that the system can determine the field of view of the user. However, a human will not perceive everything in front of them. Instead, a user's eyes will be directed at a subset of the environment. Therefore, in one embodiment, the system will include technology for tracking the position of the user's eyes in order to refine the measurement of the field of view of the user. For example, head mounted display device 2 includes eye tracking assembly 134 (FIG. 3A) which will include an eye tracking illumination device 134A (see FIG. 4A) and eye tracking camera 134B (see FIG. 4A). In one embodiment, eye tracking illumination source 134A includes one or more infrared (IR) emitters, which emit IR light toward the eye. Eye tracking camera 134B includes one or more cameras that sense the reflected IR light. The position of the pupil can be identified by known imaging techniques which detects the reflection of the cornea. For example, see U.S. Pat. No. 7,401,920, entitled "Head Mounted Eye Tracking and Display System", issued Jul. 22, 2008 to Kranz et al., incorporated herein by reference. Such a technique can locate a position of the center of the eye relative to the tracking camera. Generally, eye tracking involves obtaining an image of the eye and using computer vision techniques to determine the location of the pupil within the eye socket. In one embodiment, it is sufficient to track the location of one eye since the eye usually moves in unison. However, it is possible to track each eye separately.

In one embodiment, the eye tracking illumination device 134A will use four IR LEDs and the eye tracking camera 134B four IR photo detectors (not illustrated) in rectangular arrangement so that there is one IR LED and IR photo detector at each corner of the lens of head mounted display device 2. Light from the LEDs reflect off the eyes. The amount of infrared light detected at each of the four IR photo detectors determines the pupil direction. That is, the amount of white versus black in the eye will determine the amount of light reflected off the eye for that particular photo detector. Thus, the photo detector will have a measure of the amount of white or black in the eye. From the four samples, the system can determine the direction of the eye.

Another alternative is to use four infrared LEDs as discussed above, but only one infrared CCD on the side of the lens of head mounted display device 2. The CCD will use a small mirror and/or lens (fish eye) such that the CCD can image up to 75% of the visible eye from the glasses frame. The CCD will then sense an image and use computer vision to find the eye position, much like as discussed above. Thus, although FIGS. 3A-3C show one assembly with one IR emitter, the structure of FIG. 2 can be adjusted to have four IR transmitters and/or four IR sensors. (Note: figure reference needs to be updated. Don't see this in any of the figures) More or less than four IR transmitters and/or four IR sensors can also be used.

Another embodiment for tracking the direction of the eyes is based on charge tracking. This concept is based on the observation that a retina carries a measurable positive charge and the cornea has a negative charge. Sensors are mounted by the user's ears (near earphones 130) to detect the electrical potential while the eyes move around and effectively read out what the eyes are doing in real time. Other embodiments for tracking eyes can also be used.

FIG. 3B-3D illustrate alternative embodiments 2b and 2c of a portion of head mounted display device 2. In FIGS. 3B-3D like reference numbers reference like parts as those identified in FIG. 3A.

FIG. 3B illustrates a non-see-through head mounted display device 2b. The display device 2b of FIG. 3B uses a forward facing lens 133a coupled to a waveguide 124A to couple a view of the scene (such as environment 1100) to the user's eye 140. A micro display 153 may comprise any of the aforementioned display types such LCD, LED or OLED or the like, having a resolution defined by an array of individually activated pixel elements, a combination of which is used to generate the portion of the optimized image suitable for coupling to the fovea of a user. Microdisplay 153 may be coupled to a plurality of micro-electromechanical elements 160a coupled at each corner of the display to position the display in three dimensions relative to the user's eye 140. Thus, micro display 153 may have multiple axes "Z" and "X" of rotation about a center point of the display, as well as vertical "V" and lateral "L" positioning relative to the user's eye.

As shown in FIG. 3B, only those elements of the display which render the image portion 1126 of the optimized image, in this case a bird 1126, are driven to provide a high resolution image so that the focal region of the user's eye 140 is directly coupled to the light from the image 1126. Image 1126 is surrounded by a portion 1126a to illustrate that only the image 1126, a portion of the optimized image 1200 of the entire field of view of the user in the environment, is rendered in FIG. 3B.

FIGS. 3c and 3d show another alternative embodiment 2b of the present technology. FIG. 3D is a top view and FIG. 3C a side view of head mounted display device 2D. In FIGS. 3C and 3D the head mounted display device 2c includes a support structure 162, micro-electromechanical elements 160,161, 163 (and a fourth micro-electromechanical element—not shown), and mirror 166. One or more microdisplay elements 170 are positioned adjacent to mirror 166, where elements 170 may be equivalent to displays 120 described with respect to FIG. 3A. Mirror 166 may be moved relative to the display structure 162 by micromechanical elements 160,161, 163 to direct emissions from the microdisplay elements into the focal region of the user's eye. Micromechanical elements 160, 161, 163 may comprise piezoelectric elements, or other mechanically controlled or electromechanically controlled elements which, when used in cooperation, can position mirror 166 along three axes of movement relative to the support structure 162. In a manner similar to microdisplay 153 the micro-electromechanical elements 160-163 are coupled at each corner of the mirror to position the mirror in three dimensions relative to the user's eye 140. Thus, mirror 166 may have multiple axes "Z" and "X" of rotation about a center point of the display, as well as vertical "V" and lateral "L" positioning relative to the user's eye. It should be recognized that the movement of mirror 166 may be used alone or in combination with a directional output of the micro display elements to position the optimized portion of the image (in this example, bird image 1126) in the user's focal region.

FIG. 3A-3D only show half of the head mounted display device 2a-2c. A full head mounted display device would include (where applicable) another set lenses, another opacity filter another light guide optical element, another micro display, another lens, room facing camera, eye tracking assembly, micro display, earphones, and temperature sensor.

Figure 4A:
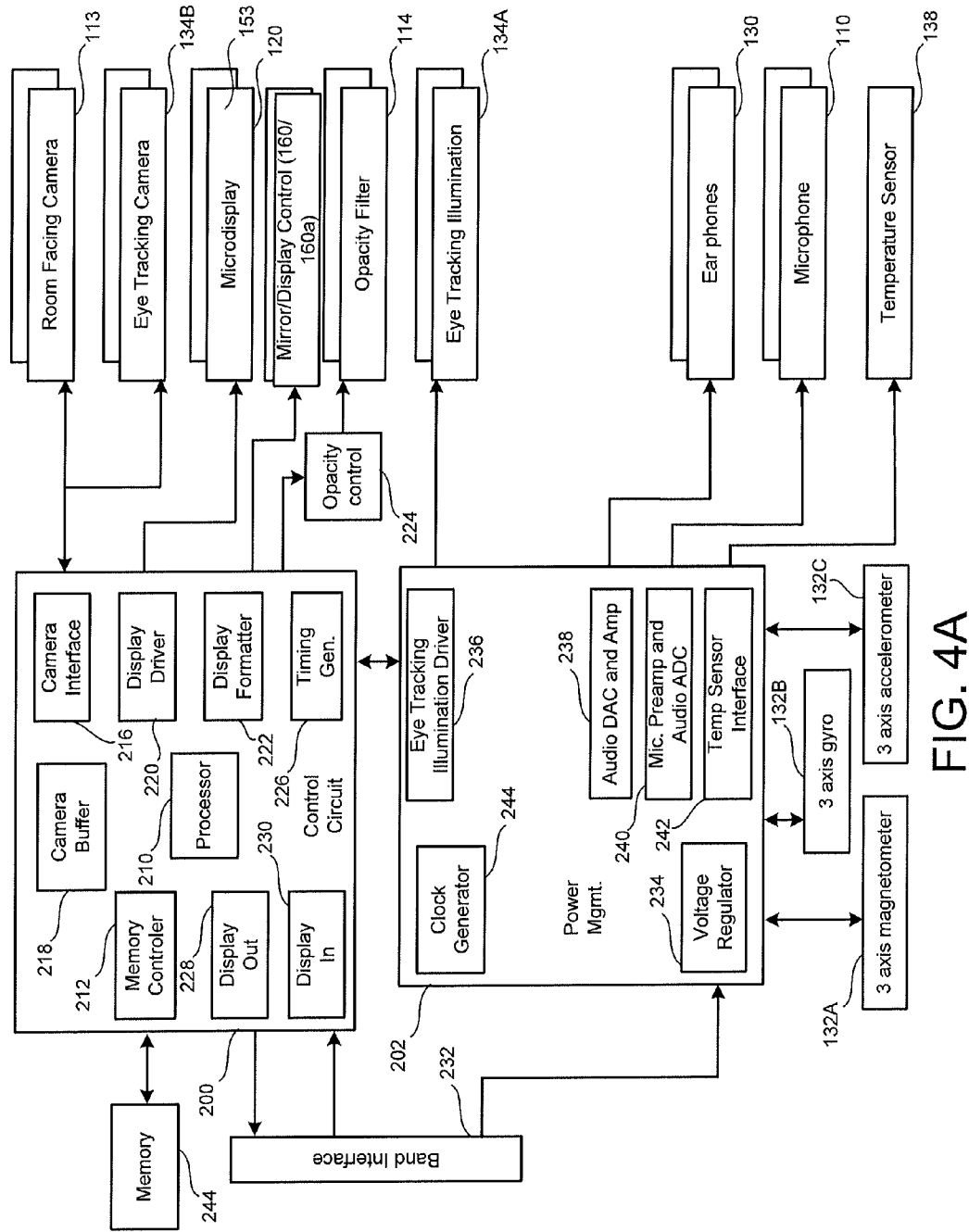
FIG. 4A is a block diagram of one embodiment of the components of a head mounted display unit.
Figure 4B:
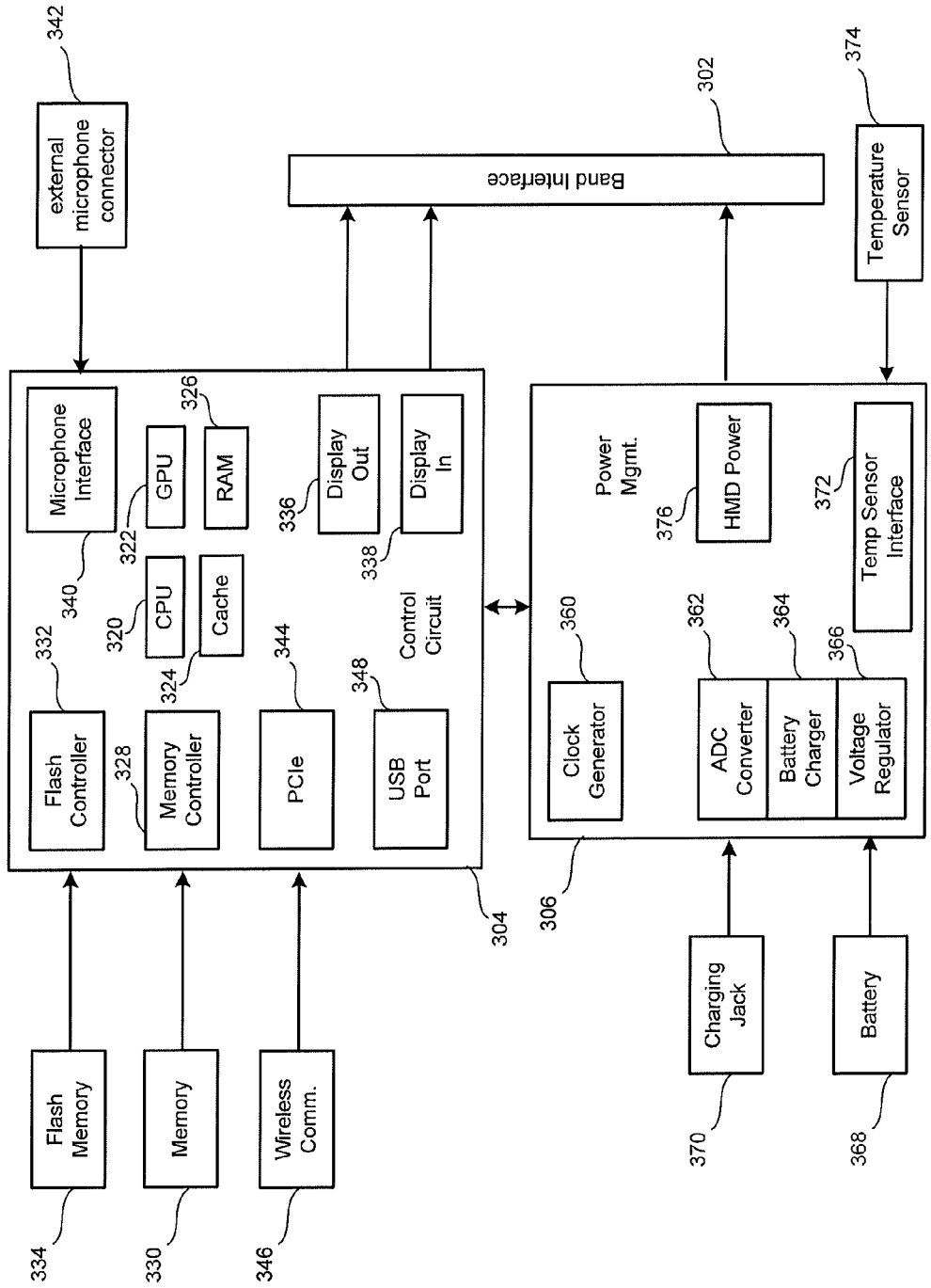
FIG. 4B is a block diagram of one embodiment of the components of a processing unit associated with a head mounted display unit.

FIG. 4A is a block diagram depicting the various components of head mounted display devices 2a-2c. It will be understood with reference to FIGS. 3A-3D that some components illustrated in FIG. 4A may not be present in each embodiment shown in FIGS. 3A-3D. FIG. 4B is a block diagram describing the various components of processing unit 4. Each of the head mounted display devices 2, the components of which are depicted in FIG. 4A, are used to display an optimized image to the user. Additionally, the head mounted display device components of FIG. 4A include many sensors that track various conditions. Head mounted display devices 2a-2c will receive instructions about the virtual image from processing unit 4 and will provide the sensor information back to processing unit 4. Processing unit 4, the components of which are depicted in FIG. 4B will receive the sensory information from head mounted display devices 2a-2c and also from hub computing device 12 (See FIG. 1). Based on that information, processing unit 4 will determine where and when to provide a virtual image to the user and send instructions accordingly to the head mounted display device of FIG. 4A.

Note that some of the components of FIG. 4A (e.g., rear facing camera 113, eye tracking camera 134B, micro display 120 or 153, opacity filter 114, eye tracking illumination 134A, and earphones 130) are shown in shadow to indicate that there may be two of each of those devices, one for the left side and one for the right side of head mounted display device 2. FIG. 4A shows the control circuit 200 in communication with the power management circuit 202. Control circuit 200 includes processor 210, memory controller 212 in communication with memory 214 (e.g., D-RAM), camera interface 216, camera buffer 218, display driver 220, display formatter 222, timing generator 226, display out interface 228, and display in interface 230. In one embodiment, all of components of control circuit 200 are in communication with each other via dedicated lines or one or more buses. In another embodiment, each of the components of control circuit 200 is in communication with processor 210. Camera interface 216 provides an interface to the two room facing cameras 113 and stores images received from the room facing cameras in camera buffer 218. Display driver 220 will drive micro display 120 or 153. Display formatter 222 provides information, about the virtual image being displayed on micro display 120 or 153, to opacity control circuit 224, which controls opacity filter 114. Timing generator 226 is used to provide timing data for the system. Display out interface 228 is a buffer for providing images from room facing cameras 113 to the processing unit 4. Display in 230 is a buffer for receiving images such as a virtual image to be displayed on micro display 120. Display out 228 and display in 230 communicate with band interface 232 which is an interface to processing unit 4. Display driver 220 may also drive mirror controller 162 to position the mirror 166 to display a focused image in accordance with the above embodiment of FIGS. 3C and 3D.

Power management circuit 202 includes voltage regulator 234, eye tracking illumination driver 236, audio DAC and amplifier 238, microphone preamplifier audio ADC 240, temperature sensor interface 242 and clock generator 244. Voltage regulator 234 receives power from processing unit 4 via band interface 232 and provides that power to the other components of head mounted display device 2. Eye tracking illumination driver 236 provides the IR light source for eye tracking illumination 134A, as described above. Audio DAC and amplifier 238 receive the audio information from earphones 130. Microphone preamplifier and audio ADC 240 provide an interface for microphone 110. Temperature sensor interface 242 is an interface for temperature sensor 138. Power management unit 202 also provides power and receives data back from three axis magnetometer 132A, three axis gyro 132B and three axis accelerometer 132C.

FIG. 4B is a block diagram describing the various components of processing unit 4. FIG. 4B shows controls circuit 304 in communication with power management circuit 306. Control circuit 304 includes a central processing unit (CPU) 320, graphics processing unit (GPU) 322, cache 324, RAM 326, memory control 328 in communication with memory 330 (e.g., D-RAM), flash memory controller 332 in communication with flash memory 334 (or other type of non-volatile storage), display out buffer 336 in communication with head mounted display device 2 via band interface 302 and band interface 232, display in buffer 338 in communication with head mounted display device 2 via band interface 302 and band interface 232, microphone interface 340 in communication with an external microphone connector 342 for connecting to a microphone, PCI express interface for connecting to a wireless communication device 346, and USB port(s) 348. In one embodiment, wireless communication device 346 can include a Wi-Fi enabled communication device, BlueTooth communication device, infrared communication device, etc. The USB port can be used to dock the processing unit 4 to hub computing device 12 in order to load data or software onto processing unit 4, as well as charge processing unit 4. In one embodiment, CPU 320 and GPU 322 are the main workhorses for determining where, when and how to insert virtual images into the view of the user. More details are provided below.

Power management circuit 306 includes clock generator 360, analog to digital converter 362, battery charger 364, voltage regulator 366, head mounted display power source 376, and temperature sensor interface 372 in communication with temperature sensor 374 (located on the wrist band of processing unit 4). Analog to digital converter 362 is connected to a charging jack 370 for receiving an AC supply and creating a DC supply for the system. Voltage regulator 366 is in communication with battery 368 for supplying power to the system. Battery charger 364 is used to charge battery 368 (via voltage regulator 366) upon receiving power from charging jack 370. HMD power source 376 provides power to the head mounted display device 2.

The above-described system will be configured to insert a virtual image into the field of view of a user so that the virtual image replaces the view of a real world object. Alternatively, the virtual image can be inserted without replacing the image of a real world object. In various embodiments, the virtual image will be adjusted to match the appropriate orientation, size and shape based on the object being replaced or the environment for which the image is being inserted into. In addition, the virtual image can be adjusted to include reflectivity and shadows. In one embodiment, head mounted display device 12, processing unit 4 and hub computing device 12 work together as each of the devices includes a subset of sensors that are used to obtain the data for determining where, when and how to insert the virtual images. In one embodiment, the calculations that determine where, how and when to insert a virtual image and performed by the hub computing device 12. In another embodiment, those calculations are performed by processing unit 4. In another embodiment some of the calculations are performed by hub computing device 12 while other calculations are performed by processing unit 4. In other embodiments, the calculations can be performed by head mounted display device 12.

In one example embodiment, hub computing device 12 will create a model of the environment that the user is in and track various moving objects in that environment. In addition, hub computing device 12 tracks the field of view of the head mounted display device 2 by tracking the position and orientation of head mounted display device 2. The model and the tracking information are provided from hub computing device 12 to processing unit 4. Sensor information obtained by head mounted display device 2 is transmitted to processing unit 4. Processing unit 4 then uses additional sensor information it receives from head mounted display device 2 to refine the field of view of the user and provide instructions to head mounted display device 2 on how, where and when to insert the virtual image.

Figure 5:
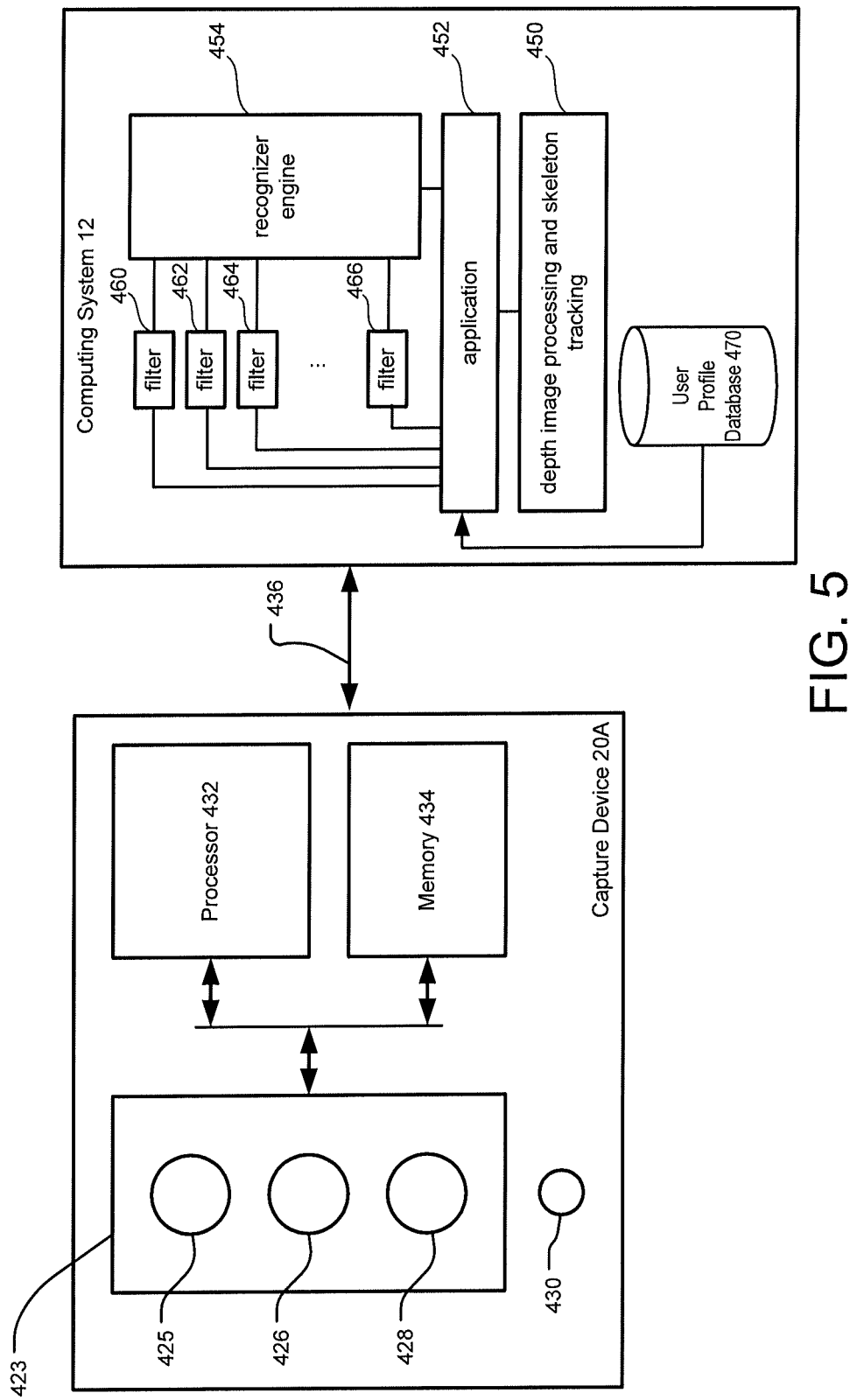
FIG. 5 is a block diagram of one embodiment of the components of a hub computing system used with head mounted display unit.

FIG. 5 illustrates an example embodiment of hub computing system 12 with a capture device. In one embodiment, capture devices 20A and 20B are the same structure, therefore, FIG. 5 only shows capture device 20A. According to an example embodiment, capture device 20A may be configured to capture video with depth information including a depth image that may include depth values via any suitable technique including, for example, time-of-flight, structured light, stereo image, or the like. According to one embodiment, the capture device 20A may organize the depth information into "Z layers," or layers that may be perpendicular to a Z axis extending from the depth camera along its line of sight.

As shown in FIG. 5, capture device 20A may include a camera component 423. According to an example embodiment, camera component 423 may be or may include a depth camera that may capture a depth image of a scene. The depth image may include a two-dimensional (2-D) pixel area of the captured scene where each pixel in the 2-D pixel area may represent a depth value such as a distance in, for example, centimeters, millimeters, or the like of an object in the captured scene from the camera.

Camera component 23 may include an infra-red (IR) light component 425, a three-dimensional (3-D) camera 426, and an RGB (visual image) camera 428 that may be used to capture the depth image of a scene. For example, in time-of-flight analysis, the IR light component 425 of the capture device 20A may emit an infrared light onto the scene and may then use sensors (in some embodiments, including sensors not shown) to detect the backscattered light from the surface of one or more targets and objects in the scene using, for example, the 3-D camera 426 and/or the RGB camera 428. In some embodiments, pulsed infrared light may be used such that the time between an outgoing light pulse and a corresponding incoming light pulse may be measured and used to determine a physical distance from the capture device 20A to a particular location on the targets or objects in the scene. Additionally, in other example embodiments, the phase of the outgoing light wave may be compared to the phase of the incoming light wave to determine a phase shift. The phase shift may then be used to determine a physical distance from the capture device to a particular location on the targets or objects.

According to another example embodiment, time-of-flight analysis may be used to indirectly determine a physical distance from the capture device 20A to a particular location on the targets or objects by analyzing the intensity of the reflected beam of light over time via various techniques including, for example, shuttered light pulse imaging.

In another example embodiment, capture device 20A may use a structured light to capture depth information. In such an analysis, patterned light (i.e., light displayed as a known pattern such as grid pattern, a stripe pattern, or different pattern) may be projected onto the scene via, for example, the IR light component 424. Upon striking the surface of one or more targets or objects in the scene, the pattern may become deformed in response. Such a deformation of the pattern may be captured by, for example, the 3-D camera 426 and/or the RGB camera 428 (and/or other sensor) and may then be analyzed to determine a physical distance from the capture device to a particular location on the targets or objects. In some implementations, the IR Light component 425 is displaced from the cameras 425 and 426 so triangulation can be used to determined distance from cameras 425 and 426. In some implementations, the capture device 20A will include a dedicated IR sensor to sense the IR light, or a sensor with an IR filter.

According to another embodiment, the capture device 20A may include two or more physically separated cameras that may view a scene from different angles to obtain visual stereo data that may be resolved to generate depth information. Other types of depth image sensors can also be used to create a depth image.

The capture device 20A may further include a microphone 430, which includes a transducer or sensor that may receive and convert sound into an electrical signal. Microphone 430 may be used to receive audio signals that may also be provided by hub computing system 12.

In an example embodiment, the capture device 20A may further include a processor 432 that may be in communication with the image camera component 423. Processor 432 may include a standardized processor, a specialized processor, a microprocessor, or the like that may execute instructions including, for example, instructions for receiving a depth image, generating the appropriate data format (e.g., frame) and transmitting the data to hub computing system 12.

Capture device 20A may further include a memory 434 that may store the instructions that are executed by processor 432, images or frames of images captured by the 3-D camera and/or RGB camera, or any other suitable information, images, or the like. According to an example embodiment, memory 434 may include random access memory (RAM), read only memory (ROM), cache, flash memory, a hard disk, or any other suitable storage component. As shown in FIG. 5, in one embodiment, memory 434 may be a separate component in communication with the image capture component 423 and processor 432. According to another embodiment, the memory 434 may be integrated into processor 432 and/or the image capture component 422.

Capture devices 20A and 20B are in communication with hub computing system 12 via a communication link 436. The communication link 436 may be a wired connection including, for example, a USB connection, a Firewire connection, an Ethernet cable connection, or the like and/or a wireless connection such as a wireless 802.11b, g, a, or n connection. According to one embodiment, hub computing system 12 may provide a clock to capture device 20A that may be used to determine when to capture, for example, a scene via the communication link 436. Additionally, the capture device 20A provides the depth information and visual (e.g., RGB) images captured by, for example, the 3-D camera 426 and/or the RGB camera 428 to hub computing system 12 via the communication link 436. In one embodiment, the depth images and visual images are transmitted at 30 frames per second; however, other frame rates can be used. Hub computing system 12 may then create and use a model, depth information, and captured images to, for example, control an application such as a game or word processor and/or animate an avatar or on-screen character.

Hub computing system 12 includes depth image processing and skeletal tracking module 450, which uses the depth images to track one or more persons detectable by the depth camera function of capture device 20A. Depth image processing and skeletal tracking module 450 provides the tracking information to application 453, which can be a video game, productivity application, communications application or other software application etc. The audio data and visual image data is also provided to application 452 and depth image processing and skeletal tracking module 450. Application 452 provides the tracking information, audio data and visual image data to recognizer engine 454. In another embodiment, recognizer engine 454 receives the tracking information directly from depth image processing and skeletal tracking module 450 and receives the audio data and visual image data directly from capture devices 20A and 20B.

Recognizer engine 454 is associated with a collection of filters 460, 462, 464, . . . , 466 each comprising information concerning a gesture, action or condition that may be performed by any person or object detectable by capture device 20A or 20B. For example, the data from capture device 20A may be processed by filters 460, 462, 464, . . . , 466 to identify when a user or group of users has performed one or more gestures or other actions. Those gestures may be associated with various controls, objects or conditions of application 452. Thus, hub computing system 12 may use the recognizer engine 454, with the filters, to interpret and track movement of objects (including people).

Capture devices 20A and 20B provide RGB images (or visual images in other formats or color spaces) and depth images to hub computing system 12. The depth image may be a plurality of observed pixels where each observed pixel has an observed depth value. For example, the depth image may include a two-dimensional (2-D) pixel area of the captured scene where each pixel in the 2-D pixel area may have a depth value such as distance of an object in the captured scene from the capture device. Hub computing system 12 will use the RGB images and depth images to track a user's or object's movements. For example, the system will track a skeleton of a person using the depth images. There are many methods that can be used to track the skeleton of a person using depth images. One suitable example of tracking a skeleton using depth image is provided in U.S. patent application Ser. No. 12/603,437, "Pose Tracking Pipeline" filed on Oct. 21, 2009, Craig, et al. (hereinafter referred to as the '437 Application), incorporated herein by reference in its entirety. The process of the '437 Application includes acquiring a depth image, down sampling the data, removing and/or smoothing high variance noisy data, identifying and removing the background, and assigning each of the foreground pixels to different parts of the body. Based on those steps, the system will fit a model to the data and create a skeleton. The skeleton will include a set of joints and connections between the joints. Other methods for tracking can also be used. Suitable tracking technologies are also disclosed in the following four U.S. Patent Applications, all of which are incorporated herein by reference in their entirety: U.S. patent application Ser. No. 12/475,308, "Device for Identifying and Tracking Multiple Humans Over Time," filed on May 29, 2009; U.S. patent application Ser. No. 12/696,282, "Visual Based Identity Tracking," filed on Jan. 29, 2010; U.S. patent application Ser. No. 12/641,788, "Motion Detection Using Depth Images," filed on Dec. 18, 2009; and U.S. patent application Ser. No. 12/575,388, "Human Tracking System," filed on Oct. 7, 2009.

Recognizer engine 454 includes multiple filters 460, 462, 464, . . . , 466 to determine a gesture or action. A filter comprises information defining a gesture, action or condition along with parameters, or metadata, for that gesture, action or condition. For instance, a throw, which comprises motion of one of the hands from behind the rear of the body to past the front of the body, may be implemented as a gesture comprising information representing the movement of one of the hands of the user from behind the rear of the body to past the front of the body, as that movement would be captured by the depth camera. Parameters may then be set for that gesture. Where the gesture is a throw, a parameter may be a threshold velocity that the hand has to reach, a distance the hand travels (either absolute, or relative to the size of the user as a whole), and a confidence rating by the recognizer engine that the gesture occurred. These parameters for the gesture may vary between applications, between contexts of a single application, or within one context of one application over time.

Filters may be modular or interchangeable. In one embodiment, a filter has a number of inputs (each of those inputs having a type) and a number of outputs (each of those outputs having a type). A first filter may be replaced with a second filter that has the same number and types of inputs and outputs as the first filter without altering any other aspect of the recognizer engine architecture. For instance, there may be a first filter for driving that takes as input skeletal data and outputs a confidence that the gesture associated with the filter is occurring and an angle of steering. Where one wishes to substitute this first driving filter with a second driving filter—perhaps because the second driving filter is more efficient and requires fewer processing resources—one may do so by simply replacing the first filter with the second filter so long as the second filter has those same inputs and outputs—one input of skeletal data type, and two outputs of confidence type and angle type.

A filter need not have a parameter. For instance, a "user height" filter that returns the user's height may not allow for any parameters that may be tuned. An alternate "user height" filter may have tunable parameters—such as to whether to account for a user's footwear, hairstyle, headwear and posture in determining the user's height.

Inputs to a filter may comprise things such as joint data about a user's joint position, angles formed by the bones that meet at the joint, RGB color data from the scene, and the rate of change of an aspect of the user. Outputs from a filter may comprise things such as the confidence that a given gesture is being made, the speed at which a gesture motion is made, and a time at which a gesture motion is made.

Recognizer engine 454 may have a base recognizer engine that provides functionality to the filters. In one embodiment, the functionality that recognizer engine 454 implements includes an input-over-time archive that tracks recognized gestures and other input, a Hidden Markov Model implementation (where the modeled system is assumed to be a Markov process—one where a present state encapsulates any past state information used to determine a future state, so no other past state information must be maintained for this purpose—with unknown parameters, and hidden parameters are determined from the observable data), as well as other functionality used to solve particular instances of gesture recognition.

Filters 460, 462, 464, . . . , 466 are loaded and implemented on top of the recognizer engine 454 and can utilize services provided by recognizer engine 454 to all filters 460, 462, 464, . . . , 466. In one embodiment, recognizer engine 454 receives data to determine whether it meets the requirements of any filter 460, 462, 464, . . . , 466. Since these provided services, such as parsing the input, are provided once by recognizer engine 454 rather than by each filter 460, 462, 464, . . . , 466, such a service need only be processed once in a period of time as opposed to once per filter for that period, so the processing used to determine gestures is reduced.

Application 452 may use the filters 460, 462, 464, . . . , 466 provided with the recognizer engine 454, or it may provide its own filter, which plugs in to recognizer engine 454. In one embodiment, all filters have a common interface to enable this plug-in characteristic. Further, all filters may utilize parameters, so a single gesture tool below may be used to debug and tune the entire filter system.

More information about recognizer engine 454 can be found in U.S. patent application Ser. No. 12/422,661, "Gesture Recognizer System Architecture," filed on Apr. 13, 2009, incorporated herein by reference in its entirety. More information about recognizing gestures can be found in U.S. patent application Ser. No. 12/391,150, "Standard Gestures," filed on Feb. 23, 2009; and U.S. patent application Ser. No. 12/474,655, "Gesture Tool" filed on May 29, 2009. both of which are incorporated herein by reference in their entirety.

In one embodiment, computing system 12 includes a user profile database 470 that includes user-specific information related to one or more users interacting with hub computing system 12. In one example, the user-specific information includes information related to a user such as the user's expressed preferences, the user's friends' list, the user's preferred activities, a list of the user's reminders, the user's social groups, the user's current location, the user's past intents to interact with objects in the user's environment and other user created content, such as the user's photos, images and recorded videos. In one embodiment, the user-specific information may be obtained from one or more data sources such as the user's social networking sites, address book, email data, Instant Messaging data, user profiles or other sources on the Internet. In one approach, and as will be discussed in detail below, the user-specific information is utilized to automatically determine the user's intent to interact with one or more objects in the user's environment.

Figure 6:
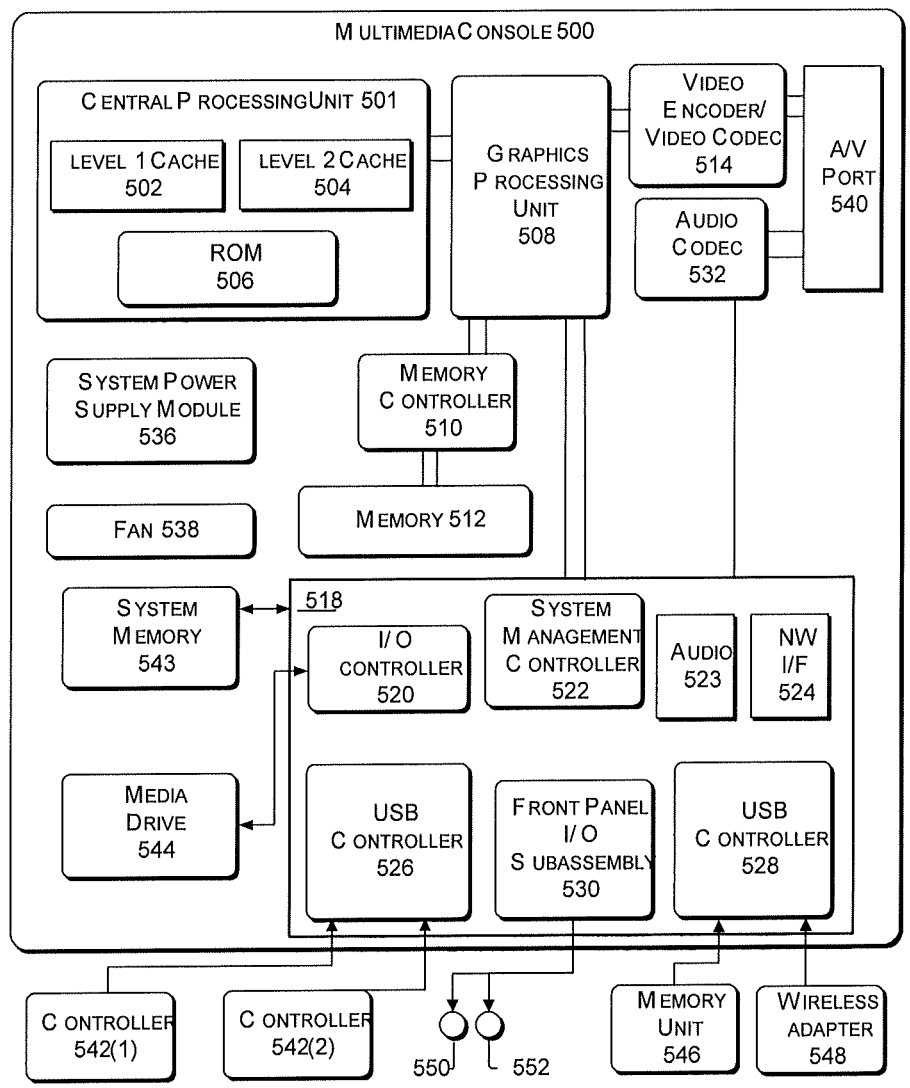
FIG. 6 is a block diagram of one embodiment of a computing system that can be used to implement the hub computing system described herein.

FIG. 6 illustrates an example embodiment of a computing system that may be used to implement hub computing system 12. As shown in FIG. 6, the multimedia console 500 has a central processing unit (CPU) 501 having a level 1 cache 502, a level 2 cache 504, and a flash ROM (Read Only Memory) 506. The level 1 cache 502 and a level 2 cache 504 temporarily store data and hence reduce the number of memory access cycles, thereby improving processing speed and throughput. CPU 501 may be provided having more than one core, and thus, additional level 1 and level 2 caches 502 and 504. The flash ROM 506 may store executable code that is loaded during an initial phase of a boot process when the multimedia console 500 is powered on.

A graphics processing unit (GPU) 508 and a video encoder/video codec (coder/decoder) 514 form a video processing pipeline for high speed and high resolution graphics processing. Data is carried from the graphics processing unit 508 to the video encoder/video codec 514 via a bus. The video processing pipeline outputs data to an A/V (audio/video) port 540 for transmission to a television or other display. A memory controller 510 is connected to the GPU 508 to facilitate processor access to various types of memory 512, such as, but not limited to, a RAM (Random Access Memory).

The multimedia console 500 includes an I/O controller 520, a system management controller 522, an audio processing unit 523, a network interface 524, a first USB host controller 526, a second USB controller 528 and a front panel I/O subassembly 530 that are preferably implemented on a module 518. The USB controllers 526 and 528 serve as hosts for peripheral controllers 542(1)-542(2), a wireless adapter 548, and an external memory device 546 (e.g., flash memory, external CD/DVD ROM drive, removable media, etc.). The network interface 524 and/or wireless adapter 548 provide access to a network (e.g., the Internet, home network, etc.) and may be any of a wide variety of various wired or wireless adapter components including an Ethernet card, a modem, a Bluetooth module, a cable modem, and the like.

System memory 543 is provided to store application data that is loaded during the boot process. A media drive 544 is provided and may comprise a DVD/CD drive, Blu-Ray drive, hard disk drive, or other removable media drive, etc. The media drive 144 may be internal or external to the multimedia console 500. Application data may be accessed via the media drive 544 for execution, playback, etc. by the multimedia console 500. The media drive 544 is connected to the I/O controller 520 via a bus, such as a Serial ATA bus or other high speed connection (e.g., IEEE 1394).

The system management controller 522 provides a variety of service functions related to assuring availability of the multimedia console 500. The audio processing unit 523 and an audio codec 532 form a corresponding audio processing pipeline with high fidelity and stereo processing. Audio data is carried between the audio processing unit 523 and the audio codec 532 via a communication link. The audio processing pipeline outputs data to the A/V port 540 for reproduction by an external audio user or device having audio capabilities.

The front panel I/O subassembly 530 supports the functionality of the power button 550 and the eject button 552, as well as any LEDs (light emitting diodes) or other indicators exposed on the outer surface of the multimedia console 100. A system power supply module 536 provides power to the components of the multimedia console 100. A fan 538 cools the circuitry within the multimedia console 500.

The CPU 501, GPU 508, memory controller 510, and various other components within the multimedia console 500 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 500 is powered on, application data may be loaded from the system memory 543 into memory 512 and/or caches 502, 504 and executed on the CPU 501. The application may present a graphical user interface that provides a consistent user experience when navigating to different media types available on the multimedia console 500. In operation, applications and/or other media contained within the media drive 544 may be launched or played from the media drive 544 to provide additional functionalities to the multimedia console 500.

The multimedia console 500 may be operated as a standalone system by simply connecting the system to a television or other display. In this standalone mode, the multimedia console 500 allows one or more users to interact with the system, watch movies, or listen to music. However, with the integration of broadband connectivity made available through the network interface 524 or the wireless adapter 548, the multimedia console 500 may further be operated as a participant in a larger network community. Additionally, multimedia console 500 can communicate with processing unit 4 via wireless adaptor 548.

When the multimedia console 500 is powered ON, a set amount of hardware resources are reserved for system use by the multimedia console operating system. These resources may include a reservation of memory, CPU and GPU cycle, networking bandwidth, etc. Because these resources are reserved at system boot time, the reserved resources do not exist from the application's view. In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., pop ups) are displayed by using a GPU interrupt to schedule code to render popup into an overlay. The amount of memory required for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV resync is eliminated.

After multimedia console 500 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 501 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Optional input devices (e.g., controllers 542(1) and 542(2)) are shared by gaming applications and system applications. The input devices are not reserved resources, but are to be switched between system applications and the gaming application such that each will have a focus of the device. The application manager preferably controls the switching of input stream, without knowing the gaming application's knowledge and a driver maintains state information regarding focus switches. Capture devices 20A and 20B may define additional input devices for the console 500 via USB controller 526 or other interface. In other embodiments, hub computing system 12 can be implemented using other hardware architectures. No one hardware architecture is required.

FIG. 1 depicts one head mounted display device 2 and processing unit 4 (collectively referred to as a mobile display device) in communication with one hub computing device 12 (referred to as a hub). In another embodiment, multiple mobile display devices can be in communication with a single hub. Each of the mobile display devices will communicate with the hub using wireless communication, as described above. In such an embodiment, it is contemplated that much of the information that is useful to all of the mobile display devices will be computed and stored at the hub and transmitted to each of the mobile display devices. For example, the hub will generate the model of the environment and provide that model to all of the mobile display devices in communication with the hub. Additionally, the hub can track the location and orientation of the mobile display devices and of the moving objects in the room, and then transfer that information to each of the mobile display devices.

Figure 7:
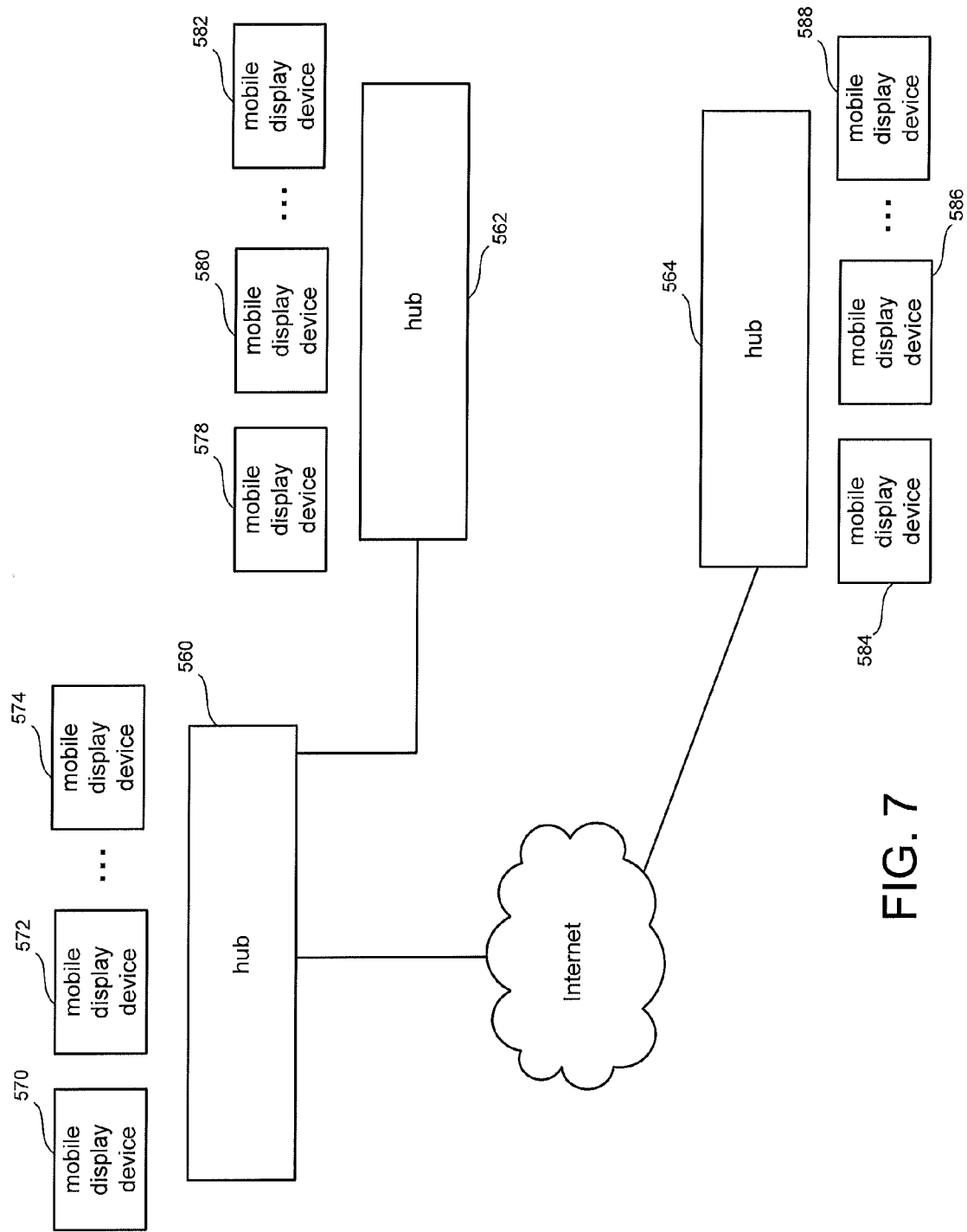
FIG. 7 is a block diagram depicting a multi-user system for generating optimized content.

In another embodiment, a system could include multiple hubs, with each hub including one or more mobile display devices. The hubs can communicate with each other directly or via the Internet (or other networks). For example, FIG. 7 shows hubs 560, 562 and 564. Hub 560 communicates directly to hub 562. Hub 560 communicates to hub 564 via the Internet. Hub 560 communicated with mobile display devices 570, 572, . . . , 574. Hub 562 communicates with mobile display device 578, 580, . . . , 582. Hub 564 communicates with mobile display device 584, 586, . . . , 588. Each of the mobile display devices communicate with their respective hub via wireless communication as discussed above. If these hubs are in a common environment, then each of the hubs can provide a portion of the model of the environments, or one hub can create the model for the other hubs. Each of the hubs will track a subset of moving objects and share that information with the other hubs, which will in turn share the information with the appropriate mobile display devices. Sensor information for the mobile display devices will be provided to their respective hubs and then shared to the other hubs for eventual sharing to the other mobile display devices. Thus, information shared between hubs can include skeleton tracking, information about the models, various states of applications, and other tracking. The information communicated between the hubs and their respective mobile display devices include tracking information of moving objects, the state and physics updates for the world models, geometry and texture information, video and audio, and other information used to perform the operations described herein.

Figure 8:
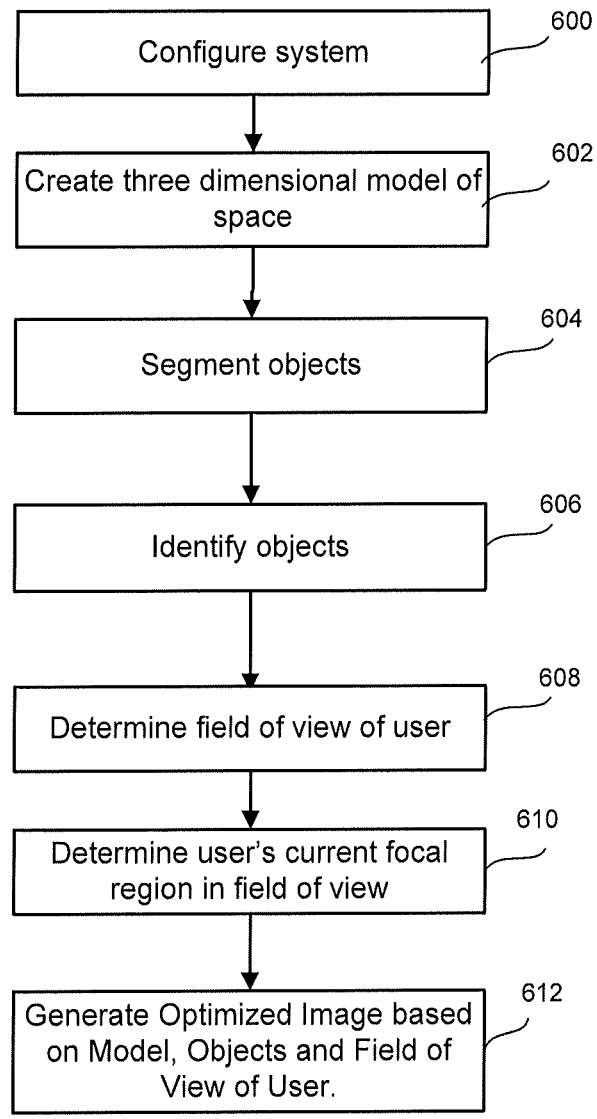
FIG. 8 describes one embodiment of a process for generating optimized content based on user intent.

FIG. 8 describes one embodiment of a process for optimizing the display of visualized information that is presented to a user of a head mounted display device. FIG. 8 illustrated one embodiment for performing step 32 in FIG. 2A above.

In step 600, the system 10 is configured. For example, an application (e.g., application 452 of FIG. 5) can configure the system to indicate that an optimized image is to be inserted into the three dimensional model of the scene, at a designated location. In another example, an application running on hub computing system 12 will indicate that augmented content (such as a particular virtual image or a virtual object) is to be inserted into the scene as part of a video game or other process.

In step 602, the system will create a volumetric model of the space for which head mounted display device 2 is located. In one embodiment, for example, hub computing device 12 will use depth images from one or more depth cameras to create a three dimensional model of the environment or scene in which head mounted display device 2 is located. In step 604, that model is segmented into one or more objects. For example, if hub computing device 12 creates a three dimensional model of a room, that room is likely to have multiple objects in it. Examples of objects that can be in a room include persons, chairs, tables, couches, etc. Step 604 includes determining distinct objects from each other. In step 606, the system will identify the objects. For example, hub computing device 12 may identify that a particular object is a table and another object is a chair.

In should be recognized that while in one embodiment creating a volumetric model and identifying objects may be used with the present technology, steps 602-608 may be omitted in an alternative embodiment. In an alternative embodiment, generation of an optimized image may take place without reference to a environment 1100 and may comprise the providing of an overlay image for use without reference to the surrounding environment. That is, the present technology does not require the use of overlay images, and may be advantageously used to display only images to the user without reference to the user's environment.

In step 608 of FIG. 8, the system determines the field of view of the user based on the model of the user space. In one embodiment, step 608 is equivalent to step 32 of FIG. 2A. That is, the system determines the environment or space the user is looking at. In one embodiment, step 608 may be performed using hub computing device 12, processing unit 4 and/or head mounted display device 2. In one example implementation, hub computing device 12 will track the user and the head mounted display device 2 in order to provide a preliminary determination of location and orientation of head mounted display device 2. Sensors on the head mounted display device 2 will be used to refine the determined orientation. For example, the inertial sensors 34, described above, can be used to refine the orientation of head mounted display device 2. Additionally, the eye tracking process described below can be used to identify a subset of the initially determined field of view that corresponds to where in particular a user is looking otherwise known as the user's focal region or depth focus in the field of view. More details will be described below with respect to FIGS. 11-13.

In step 610, the system such as software executing in processing unit 4, determines the user's current focal region within the user's field of view. In one embodiment, step 610 is equivalent to step 34 of FIG. 2A. As discussed further below in FIGS. 12 and 13, eye tracking processing based on data captured by the eye tracking camera 134 for each eye, can provide the current focal region of the user. For example, the convergence between the pupils with data indicating the face position of the user can be used to triangulate to a focal point on a focal curve, the Horopter, from which the focal region, the Panum's fusion area, can be calculated. The Panum's fusion area is the area of single vision for binocular stereopsis used by the human eyes.

In step 612, under the control of software, the processing unit 4 alone or in cooperation with the hub computing device 12 generates an optimized image. The optimized image is based on the three dimensional model, objects within the field of view which have been detected and the field of view of the user.

The optimized image may take many forms, depending on the application controlling the generation of the optimized image. It should be further understood that the term image may include a motion image—an image displaying motion of the object or objects displayed.

The user of head mounted display device 2 may then interact with an application running on hub computing device 12 (or another computing device) based on the optimized image displayed in the head mounted display device 2. The processing steps (608-612) of FIG. 8 are repeated in accordance with FIG. 2A during operation of the system such that the user's field of view and focal region are updated as the user moves his or her head, the new optimized image from the new field of view is determined and an optimized image is displayed to the user based on the user's intent. Steps 604-612 are described in more detail below.

Figure 9:
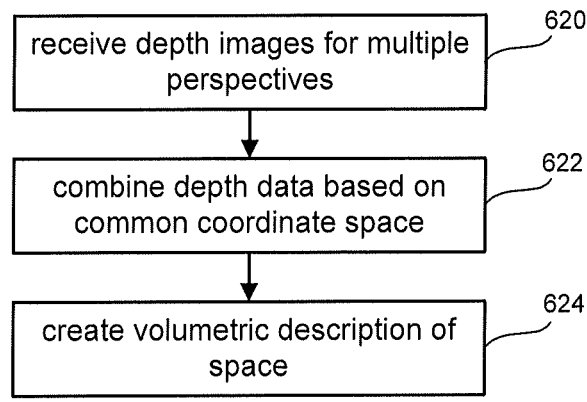
FIG. 9 describes one embodiment of a process for creating a model of the user's space.

FIG. 9 describes one embodiment of a process for creating a model of the user's space. For example, the process of FIG. 9 is one example implementation of step 602 of FIG. 8. In step 620, hub computing system 12 receives one or more depth images for multiple perspectives, such as those shown in FIG. 1, of the environment that head mounted display device is in. For example, hub computing device 12 can obtain depth images from multiple depth cameras or multiple depth images from the same camera by pointing the camera in different directions or using a depth camera with a lens that allows a full view of the environment or space for which a model will be built. In step 622, depth data from the various depth images are combined based on a common coordinate system. For example, if this system receives depth images from multiple cameras, the system will correlate the two images to have a common coordinate system (e.g., line up the images). In step 624, a volumetric description of the space is created using the depth data.

Figure 10:
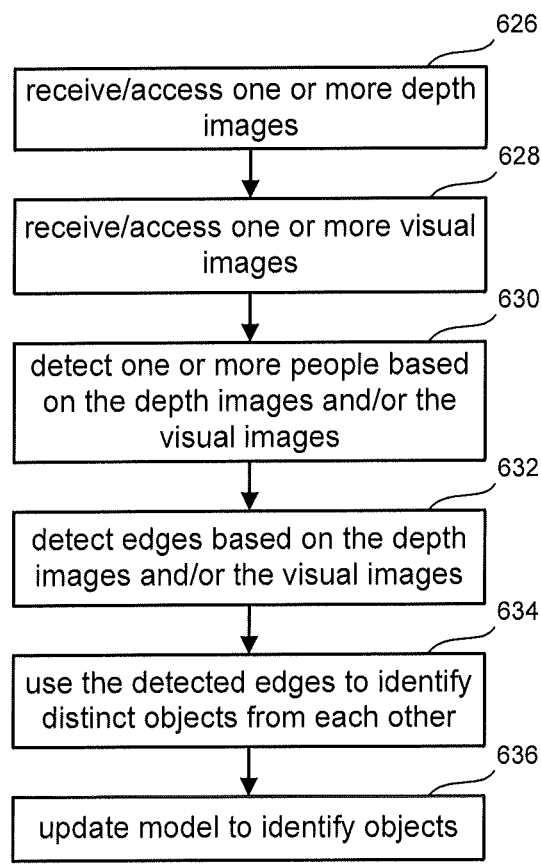
FIG. 10 is a flowchart describing one embodiment of a process for segmenting the model of the space into objects.

FIG. 10 is a flowchart describing one embodiment of a process for segmenting the model of the space into objects. For example, the process of FIG. 10 is one example implementation of step 604 of FIG. 8. In step 626 of FIG. 10, the system will receive one or more depth images from one or more depth cameras as discussed above. Alternatively, the system can access one or more depth images that it has already received. In step 628, the system will receive one or more visual images from the cameras described above. Alternatively, the system can access one or more visual images already received. In step 630, hub computing system will detect one or more people based on the depth images and/or visual images. For example, the system will recognize one or more skeletons. In step 632, hub computing device will detect edges within the model based on the depth images and/or the visual images. In step 634, hub computing device will use the detected edges to identify distinct objects from each other. For example, it is assumed that edges are boundaries between objects. In step 636, the model created using the process of FIG. 9 will be updated to show which portions of the model are associated with different objects.

FIG. 11 is a flowchart describing one embodiment of a process for determining the field of view of a user, which is an example implementation of step 608 of FIG. 8, and for determining the user's focal region, which is an example implementation of step 610 of FIG. 8. The process of FIG. 11 may rely on information from the hub computing device 12 and/or the eye tracking technology described above. FIG. 12 is a flowchart describing one embodiment of a process performed by the hub computing system to provide tracking information used in the process of FIG. 12. Alternatively, the process of FIG. 12 may be performed by processor 210 of FIG. 4A. FIG. 13 is a flowchart describing one embodiment of a process for tracking an eye, the results of which are used by the process of FIG. 12.

Where the hub computing system is utilized, in step 686 of FIG. 12, the hub computing device 12 will track the user's position. For example, hub computing device 12 will use one or more depth images and one or more visual images to track a user (e.g., using skeleton tracking). One or more depth images and one or more visual images can be used to determine the position of the head mounted display device 2 and the orientation of the head mounted display device 2 in step 688. In step 690, the position and orientation of the user and the head mounted display device 2 are transmitted from the hub computing device 12 to processing unit 4. In step 692, the position and orientation information is received at processing unit 4. The processing steps of FIG. 12 can be performed continuously during operation of the system such that the user is continuously tracked.

FIG. 13 is a flowchart describing one embodiment for tracking a position of the user's eye in the environment. In step 662, the eye is illuminated. For example, the eye can be illuminated using infrared light from eye tracking illumination 134A. In step 664, the reflection from the eye is detected using one or more eye tracking cameras 134B. In step 665, the reflection data is sent from head mounted display device 2 to processing unit 4. In step 668, processing unit 4 will determine the position of the eye based on the reflection data, as discussed above.

FIG. 11 is a flowchart describing one embodiment of a process for determining the field of view of the user (e.g., step 608 of FIG. 8) and the focal region of the user (e.g., step 610 of FIG. 8). In step 670, processing unit 4 will access the latest position and orientation information received from the hub. The process of FIG. 12 can be performed continuously as depicted by the arrow from step 686 to step 690, therefore, processing unit 4 will periodically receive updated position and orientation information from hub computing device 12. However, processing unit 4 will need to draw the virtual image more frequently than it receives the updated information from hub computing device 12. Therefore, processing unit 4 will need to rely on information sensed locally (e.g., from the head mounted device 2) to provide updates to the orientation in between samples from hub computing device 12. In addition, processing latency may also require rapid rendering of the virtual image.

Alternatively, step 670 may be performed by any number of means. The sensor technologies embedded in the head mounted display including the accelerometer, magnetometer and gyroscope, or other sensor technologies may be used to identify user position and orientation in an environment. In step 672, processing unit 4 will access data from three axis gyro 132B. In step 674, processing unit 4 will access data from three axis accelerometer 132C. In step 676, processing unit 4 will access data from three axis magnetometer 132A. In step 678, processing unit 4 will refine (or otherwise update), the position and orientation data from hub computing device 12 with the data from the gyro, accelerometer and magnetometer. In step 680, processing unit 4 will determine the potential point of view based on the location and orientation of head mounted display device. The position of the head mounted display is determined using any number of techniques and is used in conjunction with eye position tracking to determine the users field of view. Note that in some implementations, a three-dimensional model of the user's environment is not required. Any of a number of techniques for head tracking may be used. Given the sensors available from the head mounted display, inertial sensing uses inertial measurements from accelerometers and gyroscopes may be used. However, other techniques may be used. Such techniques include time of flight, spatial scan, mechanical linkages, phase-difference sensing, and/or direct field sensing. In such cases, additional hardware may be needed in the head mounted display.

In step 682, processing unit 4 will access the latest eye position information. In step 684, processing unit 4 will determine portion of model being viewed by user, as a subset of the potential point of view, based on eye position. For example, the user may be facing a wall and, therefore, the point of the view for the head mounted display could include anywhere along the wall. However, if the user's eyes are pointed to the right, then step 684 will conclude that the field of view of the user is only the right hand portion of the wall. At the conclusion of step 684, processing unit 4 has determined the point of view of the user through head mounted display 2. Then, processing unit 4 can identify a location within that field of view to insert a virtual image and block light using the opacity filter. The processing steps of FIG. 12 can be performed continuously during operation of the system such that the user's field of view and focal region are continuously updated as the user moves his or her head.

Figure 14:
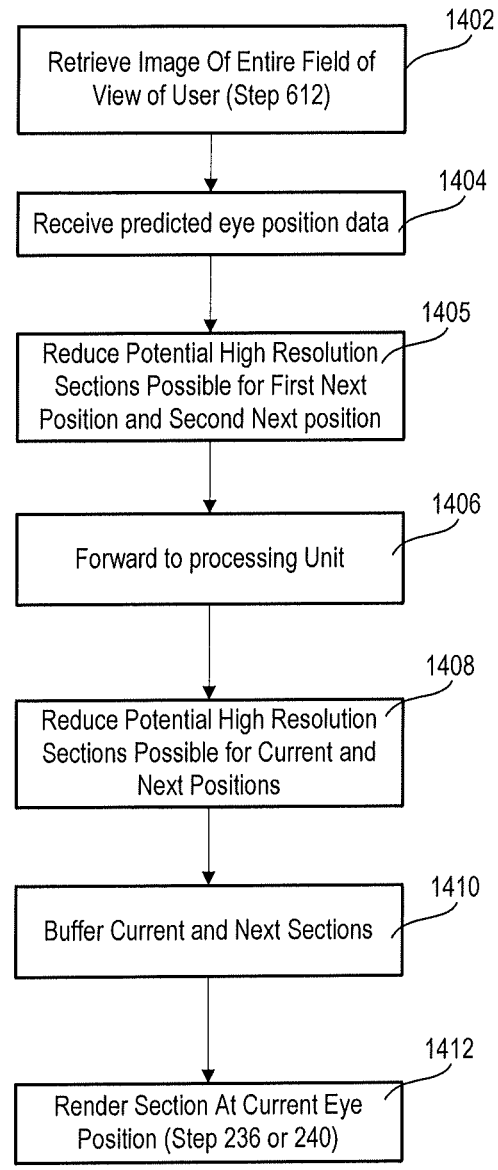
FIG. 14 is a flowchart describing one embodiment of a process for providing selected portions of an optimized imaged to couple to the user's fovea.

FIG. 14 is a flowchart describing a process for coupling a portion of the optimized image to the focal region of a user. In one embodiment, FIG. 14 is an implementation of step 236 of FIG. 2A and step 240 of FIG. 2A.

At step 1402, an image based on the detected field of view of a user is retrieved as rendered at step 612, above. The rendering may be provided by the hub computing system or any of the processing components 200 or 304 of FIGS. 4A and 4B respectively. In one embodiment, the use of the hub computing system 12 to process the image provides an efficient use of computing resources away from the head mounted display 2, and allows processing components such as components of FIGS. 4A and 4B to more actively drive the display elements and/or the micromechanical elements of the head mounted display. At 1404, predicted eye locations (calculated in accordance with FIGS. 15 and 16) may be received and at 1405, a selected number of potential high resolution portions available for coupling to the user's focal region is reduced. In one embodiment, where processing occurs the hub computing system, at 1406, a number of potential portions are selected at 1405 and moved into a buffer in one or more of the memory locations available in the processing units closet to the rendering area at the head mounted display 2. In one embodiment, such elements may be provided to memory 330 of processing unit 4. In other embodiments, the portions may be provided to memory 224 of head mounted display 2. At 1408, a further reduction of potential optimized sections which may be rendered at a current eye position and one or more next possible eye positions within the field of view is made. Again, optimized portions may be calculated at the hub computing system and buffered downstream in the processing channel such as for example, from hub computing system to memory 330, or processed at processing unit for and buffered in memory 224 at step 1410. At 1412, the high resolution portions are rendered at a location on the display in a position optimized for the viewer's focal region in accordance with steps 236 or 240.

Figure 15:
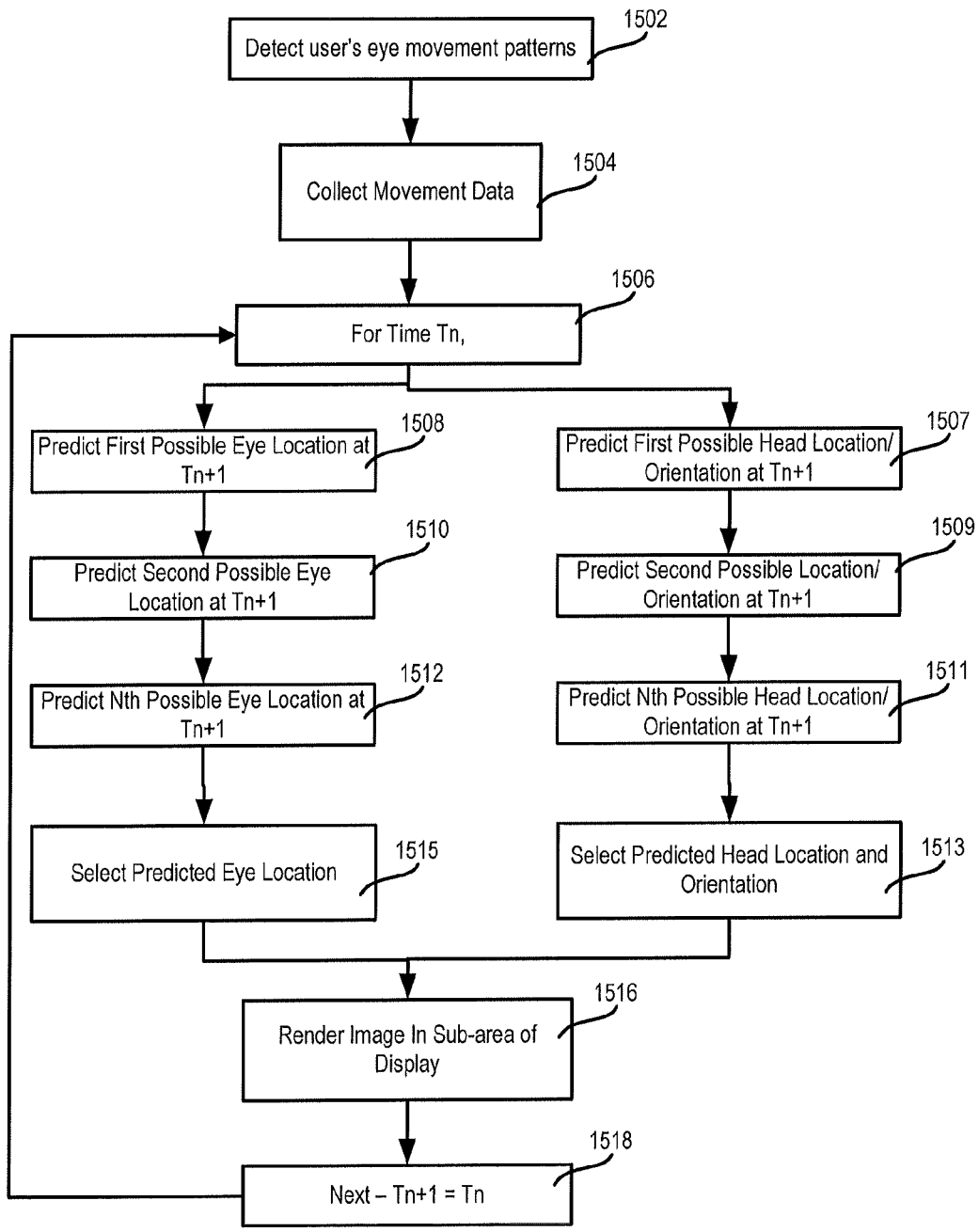
FIG. 15 is a flowchart describing a process for estimating a next-position of an eye from a current position of an eye.
Figure 16:
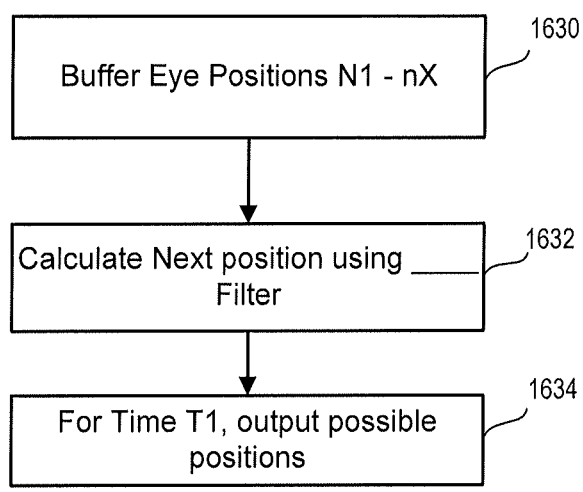
FIG. 16 is a method of predicting one or more next eye locations in accordance with the step of FIG. 15.

FIG. 15 is a flowchart illustrating a process for determining a next position of the user's eye and head position and orientation, based on tracking the position of the eye and known eye data and the head and known position and orientation data. As noted above, eye position data may be captured by eye tracking camera 134B. At 1502, a user's eye movements are captured and data collected along with the position, orientation and movement information of the user's head, available from the head mounted display sensors and the capture devices 20A, 20B, at 1504. Eye position data will comprise the position of the eye relative to the position and orientation of the head, with the head relative to the room or environment. At 1506, for each time Tn, a prediction of the location of the user's eye at a time Tn+1 is made at 1508. Alternative predictions for time Tn+1 may be computed at 1510 and 1512. A method for predicting the user eye location relative to the eye data is illustrated in FIG. 16. Also, for each time Tn, a prediction of the user's next head orientation and location at 1507 will be made. Additional predictions of head orientation and location may be made at 1510 and 1512. At 1515, one of the predicted locations of the eye will be selected for the next location in accordance with use of the image in regard to FIG. 2A, and at 1513, one of the predicted locations of the head will be selected. At 1516, the positions will be used at step 240 to determine which portion of the image to render at the next position and the method repeats at 1518 as movements of the user's eye and head continue.

FIG. 16 is a flowchart illustrating a process for predicting a possible eye location. At 1630, a plurality of data locations for user's eye are buffered and at 1632. Once a sufficient amount of data is acquired and buffered, a predicative modeling filter is used to calculate the probability that a user's eye will be at a given position at time Tn+1, Tn+2, etc. In one embodiment, a Kamlan filter is used for calculating the estimates of the true values of eye position measurements by predicting a value, estimating the uncertainty of the predicted value, and computing a weighted average of the predicted value and the measured value. The most weight is given to the value with the least uncertainty. Alternatively, a Markov model is used. A Markov model determines the state of a system with a random variable that changes through time. In this context, the Markov property suggests that the distribution for this variable depends only on the distribution of the previous state. A similar method may be used to predict head position and orientation.

Any number of successive predictions can be made and output at 1634. It should be recognized that any number of predictive algorithms can be utilized in the prediction of eye position relative to the coordinate frame of the user's head. The above references method are only two of a number of suitable embodiments.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It is intended that the scope of the technology be defined by the claims appended hereto.

What is claimed is:

1. A method of creating perception of a three dimensional (3D) mixed reality image which includes providing to respective foveal regions of a user's left and right eyes, respectively corresponding left and right optimized images by way of a 3D capable display device having a resolution, the method comprising:

for each of the user's left and right eyes, creating a respective first optimized image region in a corresponding eye-servicing portion of the display device, the created first optimized image regions each having a respective first optimized imagery rendered therein for perception by the respective one of the user's left and right eyes, where the respectively rendered first optimized imageries in the respective left and right first optimized image regions have at least one of higher resolution and greater rendering intensity than that of rendered other imagery in other regions of the corresponding eye-servicing portions of the display device, a combination of the respective left and right rendered first optimized imageries and of the rendered other imagery being based on real objects present in a current field of view of the user within a three dimensional (3D) physical and user-viewable environment that the user occupies;

respectively tracking left and right eye positions and left and right eye movements of the user relative to the current field of view to determine a corresponding 3D focal region for the user within the user's occupied and viewable 3D physical environment;

for each of the user's left and right eyes, causing optical coupling of the respectively rendered first optimized imagery in the respective first optimized image region to the respective and current location of the foveal region of the respective one of the user's left and right eyes at least by positioning of the rendered first optimized imageries in the corresponding eye-servicing portions of the display device, the rendered first optimized imageries of the respective first optimized image regions corresponding to where on the display the user's respective foveal regions are currently focusing upon;

for each of the user's left and right eyes, predicting a next eye movement position of that eye; and while the respective first optimized imageries remain rendered, beginning a rendering onto at least one of the eye-servicing portions of the display device of next optimized imagery in at least one of respective next-predicted spots of the corresponding eye-servicing portions of the display device, where the at least one of respective next-predicted spots corresponds to a predicted next foveal region position of a corresponding at least one of the user's left and right eyes.

2. The method of claim 1 wherein the creating of the respective first optimized image regions in the display includes creating the respective first optimized imageries based on a determination of a current user position within the 3D physical environment that the user occupies.

3. The method of claim 1 wherein the step of causing optical coupling comprises projecting at least a portion of a respective one of the respective first optimized imageries onto an angled reflective surface such that the projected and respective first optimized imagery will be directed by reflection to the foveal region of the corresponding eye.

4. The method of claim 3 wherein the step of optically coupling comprises positioning the portion of the image using a mechanically controlled mirror reflecting a projection of the image.

5. The method of claim 1 wherein the step of causing optical coupling comprises using an emissive display positioned in front of each eye of a user.

6. The method of claim 1 wherein the step of predicting includes:

determining at least one next position of a user eye based on data retrieved in the tracking step using at least one predictive algorithm.

7. The method of claim 1 wherein the step of optically coupling includes presenting a portion of the first optimized image over a real-world object in the environment.

8. The method of claim 1 wherein the step of optically coupling includes highlighting a real world object in the environment.

9. The method of claim 1 wherein the method further includes displaying only a portion of the first optimized image at a current position and displaying only a portion of the next optimized image at the respective next-predicted spot.

10. A head mounted display device, comprising:

a display configured to couple respective left and right optimized images respectively to foveal regions of a user's left and right eyes, the display having a resolution;

inertial sensors that sense orientation information for the head mounted display device, eye tracking sensors configured to detect respective left and right user eye positions; and at least one processing unit, in communication with the display, inertial sensors and eye tracking sensors, and configured to automatically generate respective left and right first optimized portions of respective left and right images and position the first optimized portions so as to cause corresponding optical coupling thereof to respective current positions of respective foveal regions of the user's eyes, wherein the respectively generated left and right, first optimized image portions have higher resolutions than other imagery of the respective left and right images generated by the at least one processing unit for rendering on other regions of the display, the at least one processing unit being additionally configured to determine a respective next position of the corresponding foveal region of at least one of the user's eyes and the at least one processing unit being additionally configured to cause a generating of, a positioning of and a beginning of rendering unto the display of another optimized portion of another optimized image at the determined next position corresponding to the determined next position of the foveal region of the at least one of the user's eyes while the first optimized image portions remain rendered on the display so that the another optimized portion of the image is ready to be coupled to the user's foveal region at the next position when the user's foveal region advances to gaze at the determined and respective next position.

11. The head mounted display device of claim 10, wherein the display comprises:

an image projector;

a lightguide optical element aligned with the display to allow the user to view objects in a scene in which the user is positioned; and wherein the display further comprises a mirror element coupled to mechanical control elements, the control elements responsive to the at least one processing unit to position the optimized portion of the image.

12. The head mounted display device of claim 10, wherein:
the at least one processing unit communicates with a hub computing device to receive a three dimensional model of a space that identifies one or more objects; and
the at least one processing unit determines a field of view of a user, determines if a first object is in the field of view, determines a position of the first object in the display, adjusting a size and orientation of the first optimized image based on size and orientation of the user in the scene.

13. One or more processor readable storage devices having processor readable code embodied on said one or more processor readable storage devices, the processor readable code for programming one or more processors to perform a method comprising:
creating a three dimensional model of a user immersed in a three dimensional (3D) environment and viewing a scene within the 3D environment while using a display device, the scene comprising a set of two or more objects;
determining a field of view of the user within the 3D environment based on the three dimensional model and determining a three dimensional (3D) focal region of the user within the field of view;
detecting eye movement patterns of the user relative to the determined 3D focal region of the user;
generating a first optimized image portion to be included in imagery coupled to the user's eyes, where the generated first optimized image portion visually enhances the appearance of a subset of one or more of the objects in the scene;
coupling the first optimized image portion to a corresponding foveal region of one of the user's left and right eyes as the latter currently binocularly focus onto the determined 3D focal region, the coupling including directing image light from the first optimized image portion in a direction toward the corresponding foveal region of one of the user's eyes from the display;
predicting a next eye movement for the user; and
while the first optimized image portion is being currently coupled in the direction toward the corresponding foveal region, beginning to render as part of the imagery being coupled toward the user's eyes, and thus allowing coupling thereof as a next optimized image portion to the corresponding and predicted next position of the foveal region of one of the user's eyes when that foveal region is at the next eye position by directing image light while the first optimized image portion is being currently coupled in the direction toward the corresponding foveal region, from the next optimized image portion in a direction toward the predicted next position of the corresponding foveal region of one of the user's eyes and from the display.

14. The processor readable storage device of claim 13 wherein the step of generating the first optimized image includes determining a field of view within the 3D environment for the user and creating the first optimized image based on a user position relative to the determined field of view within the 3D environment.

15. The processor readable storage device of claim 14 wherein the step of coupling the first optimized image portion includes determining a position of the first optimized image portion relative to the field of view and coupling the portion to the fovea region of the user's eye.

16. The processor readable storage device of claim 15 wherein the step of optically coupling comprises positioning the portion of the image using a mechanically controlled mirror reflecting a projection of the image.

17. The processor readable storage device of claim 16 wherein the step of predicting includes:
determining at least one next position of a user eye based on data retrieved in the tracking step using at least one predictive algorithm.

18. The processor readable storage device of claim 17 wherein the step of coupling includes presenting the first optimized image portion over a real-world object in the scene.

19. The processor readable storage device of claim 18 wherein the method further includes displaying a portion of the first optimized image at a position other than a current or next position when performing one of said coupling steps.

20. The method of claim 1 wherein the first optimized image regions have both a higher resolution and greater rendering intensity than that of rendered other imagery in other regions in the display.

* * * * *